(12) United States Patent
Datema et al.

(10) Patent No.: US 12,461,521 B2
(45) Date of Patent: *Nov. 4, 2025

(54) VEHICLE CONTROL SYSTEM

(71) Applicant: Oshkosh Corporation, Oshkosh, WI (US)

(72) Inventors: Bryan Datema, Rochester, MN (US); Cody Clifton, Oshkosh, WI (US); Xiang Gong, Oshkosh, WI (US); Zhenyi Wei, Oshkosh, WI (US); Shashank Bhatia, Rochester, MN (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,133

(22) Filed: Apr. 8, 2024

(65) Prior Publication Data

US 2024/0272634 A1 Aug. 15, 2024

Related U.S. Application Data

(63) Continuation of application No. 18/195,274, filed on May 9, 2023, now Pat. No. 11,977,376, which is a (Continued)

(51) Int. Cl.
*G05D 1/00* (2024.01)
*B28C 7/02* (2006.01)
(Continued)

(52) U.S. Cl.
CPC ............ *G05D 1/0016* (2013.01); *B28C 7/02* (2013.01); *G05D 1/0044* (2013.01); *G05D 1/223* (2024.01);
(Continued)

(58) Field of Classification Search
CPC .... G05D 1/0016; G05D 1/0044; G05D 1/223; G05D 1/225; G05D 1/0278; G05D 1/248;
(Continued)

(56) References Cited

U.S. PATENT DOCUMENTS

| 7,578,379 B2 | 8/2009 | Gillmore et al. |
| 7,648,015 B2 | 1/2010 | Gillmore et al. |

(Continued)

FOREIGN PATENT DOCUMENTS

WO WO-2005/011943 A2 2/2005

OTHER PUBLICATIONS

International Search Report and Written Opinion Received for PCT Application No. PCT/US2018/057348, Oshkosh Corporation, Jan. 17, 2019, 16 pages.

*Primary Examiner* — Richard M Camby
(74) *Attorney, Agent, or Firm* — FOLEY & LARDNER LLP

(57) ABSTRACT

A vehicle control system includes a vehicle with a vehicle controller and an electric drive motor, and a portable user device. The portable user device includes a user interface and processor configured to perform a verification process to verify that the portable user device has access to the vehicle, wirelessly connect to the vehicle via a wireless transceiver of the portable user device in response to the portable user device being verified, display a control interface for the vehicle on the user interface of the portable user device in response to connecting to the vehicle, receive an input through the control interface regarding operation of the electric drive motor, and provide a command to the vehicle controller based on the input to facilitate remote operation of the electric drive motor.

20 Claims, 14 Drawing Sheets

Related U.S. Application Data continuation of application No. 17/141,348, filed on Jan. 5, 2021, now Pat. No. 11,681,287, which is a continuation of application No. 16/169,620, filed on Oct. 24, 2018, now Pat. No. 10,901,409.

(60) Provisional application No. 62/577,048, filed on Oct. 25, 2017.

(51) Int. Cl.

| | | |
|---|---|---|
| *G05D 1/223* | (2024.01) | |
| *G05D 1/225* | (2024.01) | |
| *G07C 5/08* | (2006.01) | |
| *B60W 10/30* | (2006.01) | |
| *B60W 50/00* | (2006.01) | |
| *B60W 50/08* | (2020.01) | |
| *G05D 1/248* | (2024.01) | |
| *G06V 20/20* | (2022.01) | |
| *G07C 5/00* | (2006.01) | |

(52) U.S. Cl.
CPC .......... *G05D 1/225* (2024.01); *G07C 5/0808* (2013.01); *G07C 5/0816* (2013.01); *B60W 10/30* (2013.01); *B60W 2050/0064* (2013.01); *B60W 50/08* (2013.01); *G05D 1/0278* (2013.01); *G05D 1/248* (2024.01); *G06V 20/20* (2022.01); *G07C 5/008* (2013.01); *G07C 2205/02* (2013.01)

(58) Field of Classification Search
CPC .......... B28C 7/02; B28C 7/022; B28C 5/422; G07C 5/0808; G07C 5/0816; G07C 5/008; G07C 2205/02; B60W 10/30; B60W 50/08; B60W 2050/0064; G06V 20/20

See application file for complete search history.

(56) References Cited

U.S. PATENT DOCUMENTS

| | | | |
|---|---|---|---|
| 7,931,397 | B2 | 4/2011 | Lindblom et al. |
| 8,613,543 | B2 | 12/2013 | Lindblom et al. |
| 8,646,965 | B2 | 2/2014 | Datema et al. |
| D737,866 | S | 9/2015 | Datema et al. |
| 9,387,985 | B2 | 7/2016 | Gillmore et al. |
| 9,472,028 | B2 * | 10/2016 | Abdel-Rahman ...... G06Q 10/20 |
| D772,306 | S | 11/2016 | Datema et al. |
| 9,694,671 | B2 | 7/2017 | Wildgrube et al. |
| 9,845,191 | B2 | 12/2017 | Schwartz et al. |
| 10,657,735 | B2 | 5/2020 | Tucker et al. |
| 10,901,409 | B2 | 1/2021 | Datema et al. |
| 11,551,486 | B1 | 1/2023 | Everett et al. |
| 2002/0007225 | A1 | 1/2002 | Costello et al. |
| 2002/0087578 | A1 | 7/2002 | Vroman |
| 2002/0103582 | A1 | 8/2002 | Ohmura et al. |
| 2002/0103583 | A1 | 8/2002 | Ohmura et al. |
| 2002/0103623 | A1 | 8/2002 | Hasegawa et al. |
| 2002/0116103 | A1 | 8/2002 | Matsunaga et al. |
| 2011/0022248 | A1 | 1/2011 | Mcquade et al. |
| 2012/0065814 | A1 | 3/2012 | Seok |
| 2012/0209634 | A1 | 8/2012 | Ling et al. |
| 2013/0317693 | A1 | 11/2013 | Jefferies et al. |
| 2015/0371455 | A1 | 12/2015 | Abdel-Rahman et al. |
| 2017/0039787 | A1 | 2/2017 | Sukumaaran et al. |
| 2017/0297425 | A1 | 10/2017 | Wildgrube et al. |
| 2017/0361491 | A1 | 12/2017 | Datema et al. |
| 2017/0361492 | A1 | 12/2017 | Datema et al. |
| 2018/0039558 | A1 * | 2/2018 | Shiraishi ............. G06F 11/3608 |
| 2018/0059913 | A1 * | 3/2018 | Penilla ................ H04W 12/068 |
| 2018/0250847 | A1 | 9/2018 | Wurtz et al. |

\* cited by examiner

FIG. 17

FIG. 18

VEHICLE CONTROL SYSTEM

CROSS-REFERENCE TO RELATED PATENT APPLICATIONS

This application is a continuation of U.S. patent application Ser. No. 18/195,274, filed May 9, 2023, which is a continuation of U.S. patent application Ser. No. 17/141,348, filed Jan. 5, 2021, which is a continuation of U.S. patent application Ser. No. 16/169,620, filed Oct. 24, 2018, which claims the benefit of and priority to U.S. Provisional Patent Application No. 62/577,048, filed Oct. 25, 2017, all of which are incorporated herein by reference in their entireties.

BACKGROUND

Vehicles are typically controlled from inside using fixed control interfaces. Such interfaces, being fixed within the vehicle, do not permit an operator to use the functionality of the interfaces while outside of the vehicle.

SUMMARY

One embodiment relates to a system. The system includes a non-transitory computer-readable storage medium. The non-transitory computer-readable storage medium has instructions stored thereon that, upon execution by a processor of a portable user device, cause the processor to acquire data from a reader of the portable user device regarding an identifier on a machine, perform a verification process to verify that a user of the portable user device has access to the machine based on the identifier, wirelessly connect the portable user device to the machine in response to the user being verified to access the machine, display a control interface for the machine on a user interface of the portable user device, receive a user input through the control interface regarding operation of a controllable component of the machine, and provide a command to the machine based on the user input to facilitate remote operation of the controllable component of the machine.

Another embodiment relates to a system. The system includes a non-transitory computer-readable storage medium. The non-transitory computer-readable storage medium has instructions stored thereon that, upon execution by a processor of a portable user device, cause the processor to acquire data from a reader of the portable user device regarding an identifier on a machine, perform a verification process to verify that a user of the portable user device has access to the machine based on the identifier, wirelessly connect the portable user device to the machine in response to the user being verified to access the machine, display a control interface for the machine on a user interface of the portable user device, receive a user input through the control interface regarding operation of the machine, and provide a command to the machine to facilitate remote operation of the machine based on the user input. The reader includes at least one of a camera or a RFID reader. The identifier includes at least one of a QR code, a barcode, or a RFID tag. The control interface includes two or more of (a) a power button configured to facilitate remotely powering on or off the machine, (b) a horn button configured to facilitate activating and sounding a horn of the machine, (c) a speed toggle button configured to facilitate toggling between speed modes of the machine, or (d) a drive and steer trackpad including a drive button that is selectively repositionable within the drive and steer trackpad to facilitate driving and turning the machine.

Still another embodiment relates to a method for remotely operating a machine. The method includes acquiring, by one or more processing circuits, data from a reader of a portable user device regarding an identifier on a machine; performing, by the one or more processing circuits, a verification process to verify that a user of the portable user device has access to the machine based on the identifier; wirelessly connecting, by the one or more processing circuits, the portable user device to the machine in response to the user being verified to access the machine; displaying, by the one or more processing circuits, a control interface for the machine on a user interface of the portable user device; receiving, by the one or more processing circuits, a user input through the control interface regarding operation of the machine; and providing, by the one or more processing circuits, a command to the machine to facilitate remote operation of the machine based on the user input. The reader includes at least one of a camera or a RFID reader. The identifier includes at least one of a QR code, a barcode, or a RFID tag. The control interface includes (a) a power button configured to facilitate remotely powering on or off the machine and (b) a drive interface configured to facilitate driving and turning the machine.

The invention is capable of other embodiments and of being carried out in various ways. Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which:

FIGS. 14-20 are various illustrations of graphical user interfaces provided to a user input/output device regarding a vehicle, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to the exemplary embodiment shown in FIGS. 1-9, a vehicle or machine, shown as vehicle 10, includes a control system, shown as control system 150, and a portable user interface, shown as user input/output ("I/O") device 200. According to an exemplary embodiment, the user I/O device 200 and/or the control system 150 are configured to facilitate providing various features such as navigation (e.g., a global positioning system ("GPS"), etc.), troubleshooting walk-throughs, schematics, manuals, three-dimensional ("3D") models, automatic feature/option camera detection, calibration, settings, diagnostics, augmented reality ("AR"), and/or remote operation, among other possible features.

Figure 1:
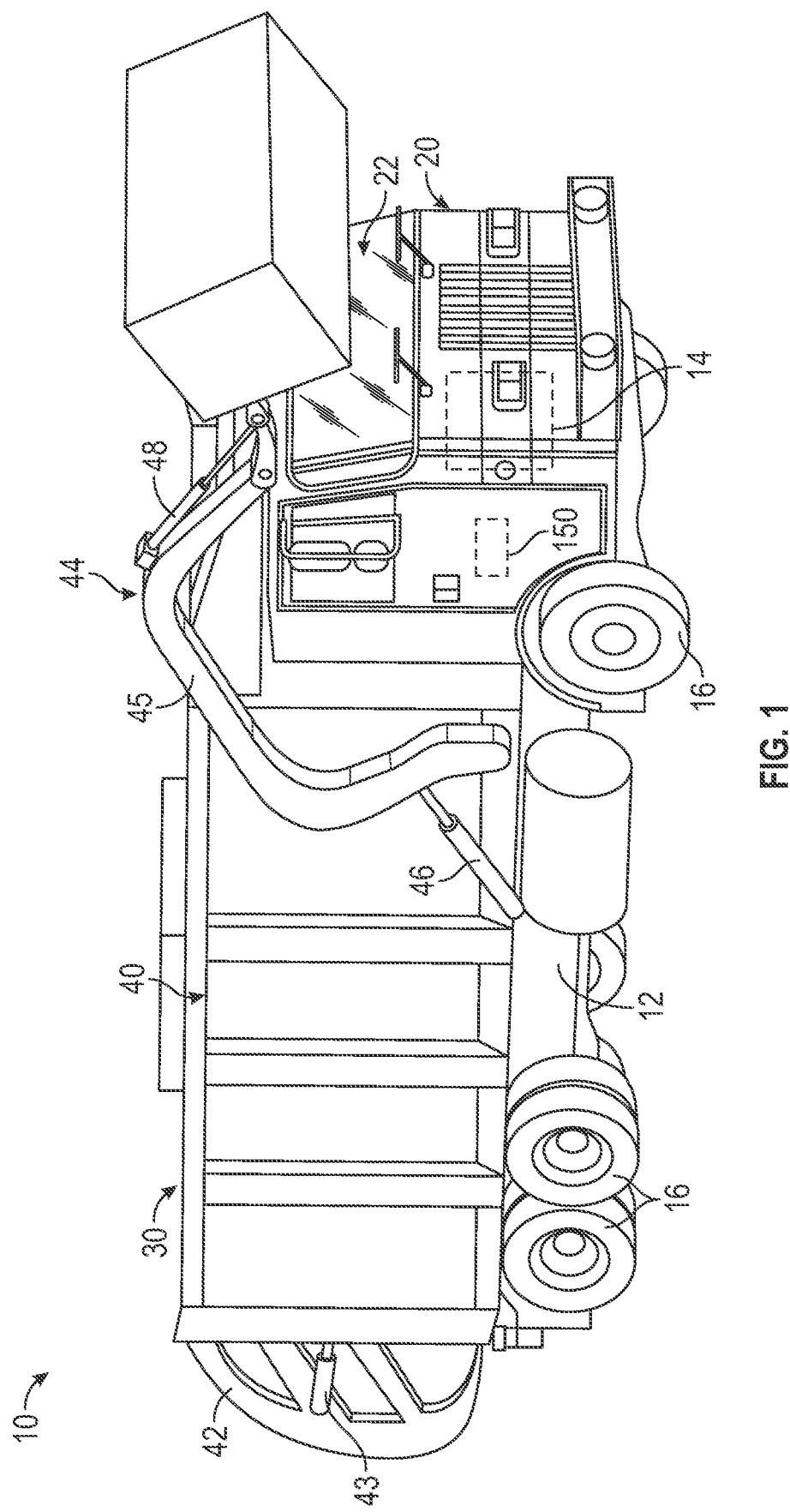
FIG. 1 is a perspective view of a refuse vehicle, according to an exemplary embodiment.
Figure 2:
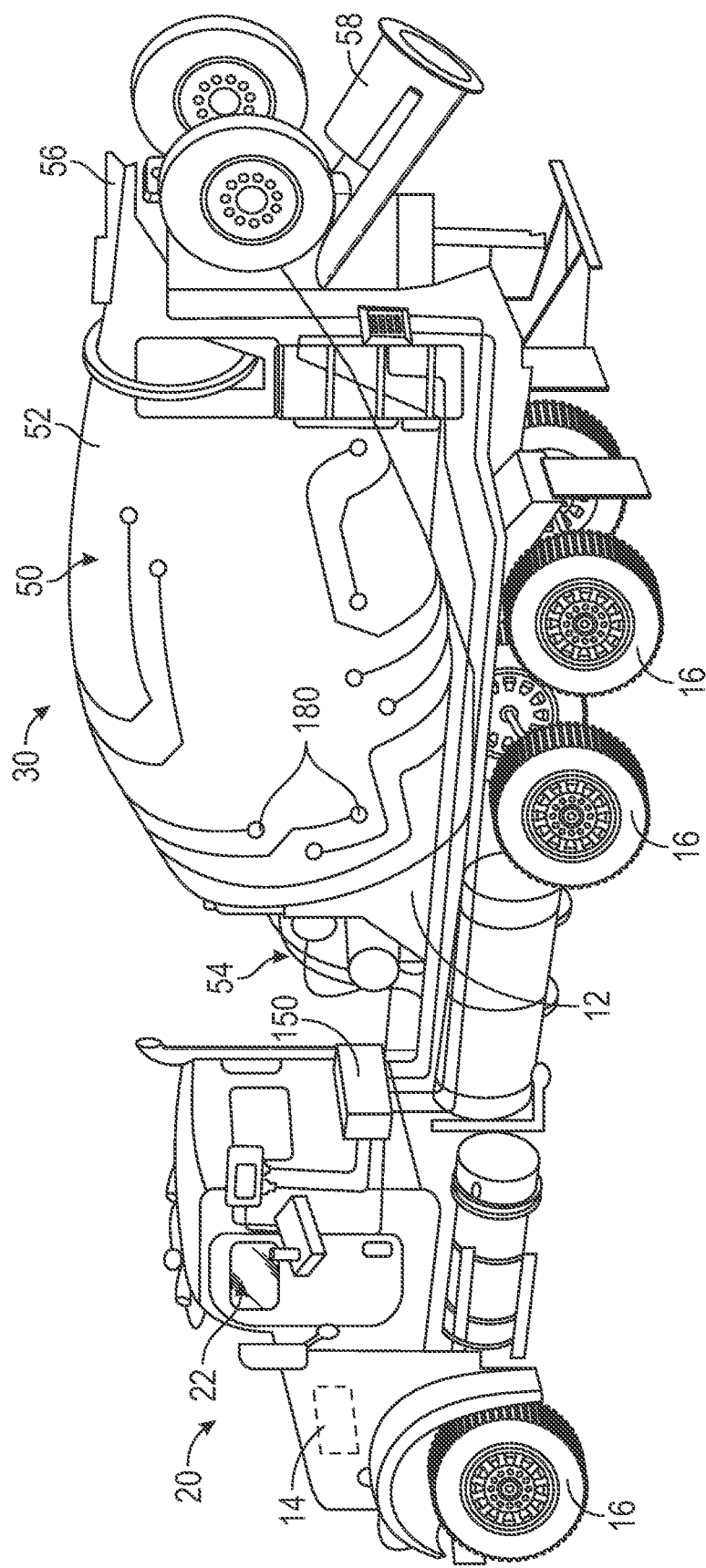
FIG. 2 is a perspective view of a mixer vehicle, according to an exemplary embodiment.
Figure 3:
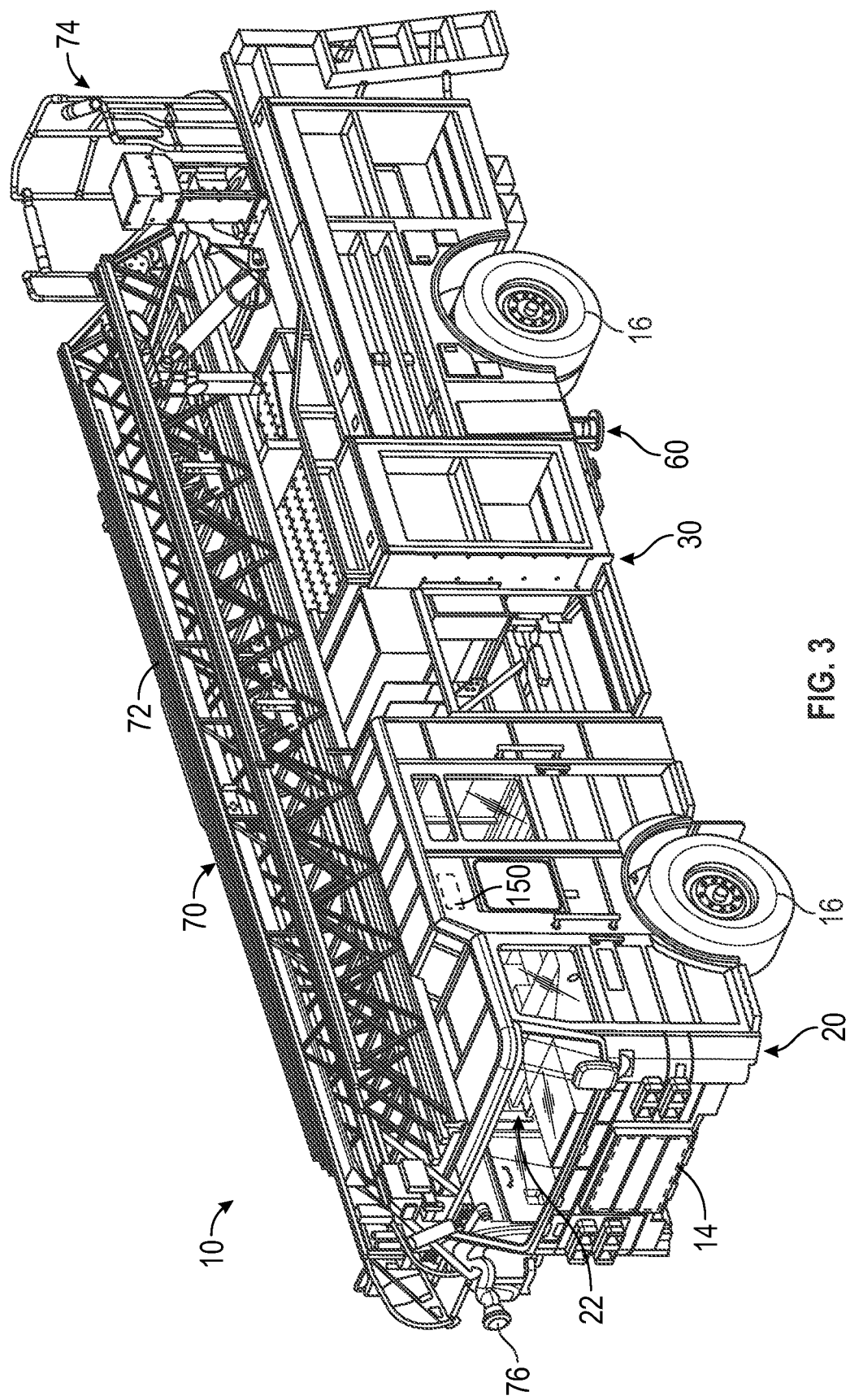
FIG. 3 is a perspective view of a fire fighting vehicle, according to an exemplary embodiment.
Figure 4:
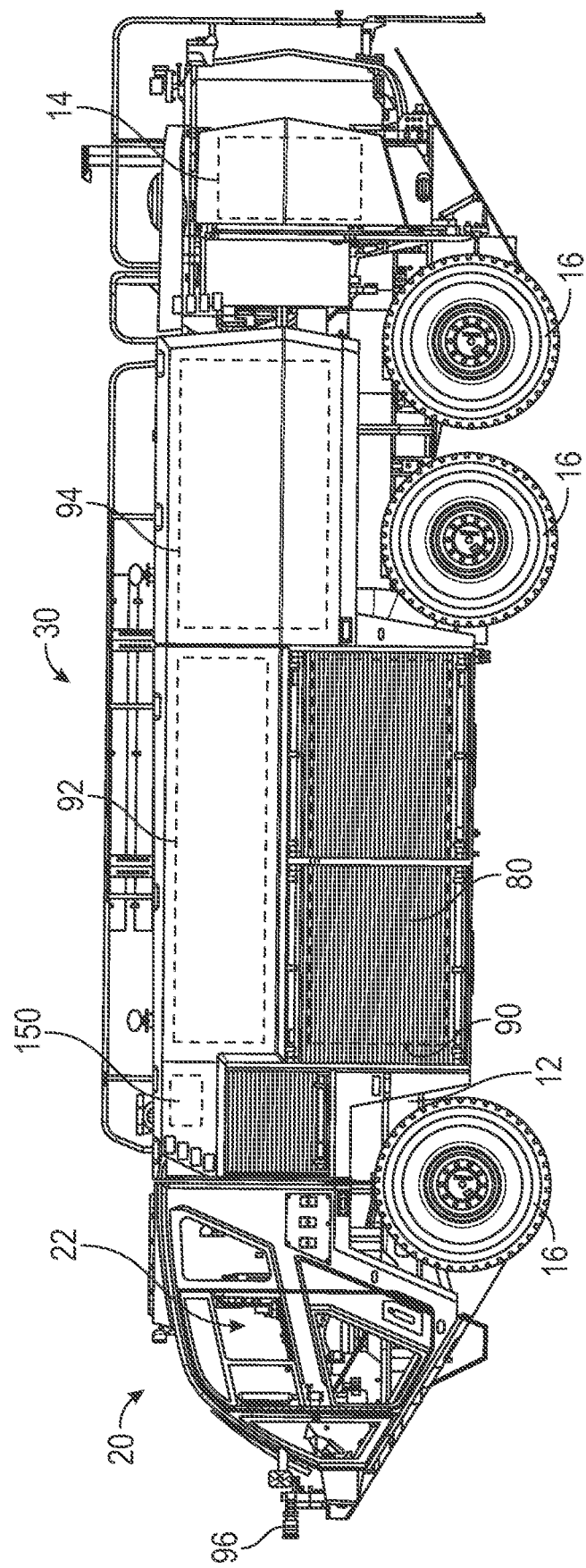
FIG. 4 is a perspective view of an airport fire fighting vehicle, according to an exemplary embodiment.

As shown in FIGS. 1-4, the vehicle 10 includes a chassis, shown as frame 12; a front cabin, shown as cab 20, coupled to the frame 12 (e.g., at a front end thereof, etc.) and defining an interior, shown as interior 22; and a rear assembly, shown as rear assembly 30, coupled to the frame 12 (e.g., at a rear end thereof, etc.). The cab 20 may include various components to facilitate operation of the vehicle 10 by an operator (e.g., a seat, a steering wheel, hydraulic controls, a user interface, switches, buttons, dials, etc.). As shown in FIGS. 1-6, the vehicle 10 includes a prime mover, shown as engine 14, coupled to the frame 12. As shown in FIGS. 1-3, the engine 14 is positioned beneath the cab 20. As shown in FIG. 4, the engine 14 is positioned within the rear assembly 30 at the rear of the vehicle 10. As shown in FIGS. 1-6, the vehicle 10 includes a plurality of tractive elements, shown as wheel and tire assemblies 16. In other embodiments, the tractive elements include track elements. According to an exemplary embodiment, the engine 14 is configured to provide power to the wheel and tire assemblies 16 and/or to other systems of the vehicle 10 (e.g., a pneumatic system, a hydraulic system, etc.). The engine 14 may be configured to utilize one or more of a variety of fuels (e.g., gasoline, diesel, biodiesel, ethanol, natural gas, etc.), according to various exemplary embodiments. According to an alternative embodiment, the engine 14 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine genset, etc.), and/or from an external power source (e.g., overhead power lines, etc.) and provide power to the systems of the vehicle 10.

According to the exemplary embodiments shown in FIG. 1, the vehicle 10 is configured as a front loading refuse vehicle (e.g., a garbage truck, a waste collection truck, a sanitation truck, a recycling truck, etc.). In other embodiments, the vehicle 10 is configured as a side-loading refuse truck or a rear-loading refuse truck. As shown in FIG. 1, the rear assembly 30 is configured as a rear body, shown as refuse compartment 40. According to an exemplary embodiment, the refuse compartment 40 facilitates transporting refuse from various waste receptacles within a municipality to a storage and/or processing facility (e.g., a landfill, an incineration facility, a recycling facility, etc.). By way of example, loose refuse may be placed into the refuse compartment 40 where it may thereafter be compacted. The refuse compartment 40 may provide temporary storage for refuse during transport to a waste disposal site and/or a recycling facility. In some embodiments, the refuse compartment 40 includes a hopper volume and a storage volume. Refuse may be initially loaded into the hopper volume and thereafter compacted into the storage volume. According to an exemplary embodiment, the hopper volume is positioned between the storage volume and the cab 20 (i.e., refuse is loaded into a position of the refuse compartment 40 behind the cab 20 and stored in a position further toward the rear of the refuse compartment 40). In other embodiments, the storage volume is positioned between the hopper volume and the cab 20 (e.g., in a rear-loading refuse vehicle, etc.). As shown in FIG. 1, the refuse compartment 40 includes a pivotable rear portion, shown as tailgate 42. The tailgate 42 is pivotally coupled to the refuse compartment 40 and movable between a closed orientation and an open orientation by actuators, shown as tailgate actuators 43 (e.g., to facilitate emptying the storage volume, etc.).

As shown in FIG. 1, the vehicle 10 includes a lift mechanism/system (e.g., a front-loading lift assembly, etc.), shown as lift assembly 44 having a pair of lift arms, shown as lift arms 45, coupled to the frame 12 and/or the rear assembly 30 on each side of the vehicle 10 such that the lift arms 45 extend forward of the cab 20 (e.g., a front-loading refuse vehicle, etc.). In other embodiments, the lift assembly 44 extends rearward of the rear assembly 30 (e.g., a rear-loading refuse vehicle, etc.). In still other embodiments, the lift assembly 44 extends from a side of the rear assembly 30 and/or the cab 20 (e.g., a side-loading refuse vehicle, etc.). The lift arms 45 may be rotatably coupled to frame 12 with a pivot (e.g., a lug, a shaft, etc.). As shown in FIG. 1, the lift assembly 44 includes actuators, shown as lift arm actuators 46 and articulation actuators 48 (e.g., hydraulic cylinders, etc.), coupled to the frame 12 and/or the lift arms 45. The lift arm actuators 46 are positioned such that extension and retraction thereof rotates the lift arms 45 about an axis extending through the pivot, according to an exemplary embodiment. The lift arms 45 may be rotated by the lift arm actuators 46 to lift a refuse container over the cab 20. The articulation actuators 48 are positioned to articulate the distal ends of the lift arms 45 coupled to the refuse container to assist in tipping refuse out of the refuse container into the hopper volume of the refuse compartment 40 (e.g., through an opening in the refuse compartment 40, etc.). The lift arm actuators 46 may thereafter rotate the lift arms 45 to return the empty refuse container to the ground.

According to the exemplary embodiment shown in FIG. 2, the vehicle 10 is configured as a concrete mixer truck. As shown in FIG. 2, the rear assembly 30 of the vehicle 10 includes a concrete drum assembly, shown as drum assembly 50. According to an exemplary embodiment, the vehicle 10 is configured as a rear-discharge concrete mixing truck. In other embodiments, the vehicle 10 is configured as a front-discharge concrete mixing truck.

As shown in FIG. 2, the drum assembly 50 of the vehicle 10 includes a drum, shown as mixing drum 52. The mixing drum 52 is coupled to the frame 12 and disposed behind the cab 20 (e.g., at a rear and/or middle of the frame 12, etc.). As shown in FIG. 2, the drum assembly 50 includes a drive system, shown as drum drive system 54, that is coupled to the frame 12. According to an exemplary embodiment, the drum drive system 54 is configured to selectively rotate the mixing drum 52 about a central, longitudinal axis thereof. In one embodiment, the drum drive system 54 is driven by the engine 14. In other embodiments, the drum drive system 54 is individually powered, separate from the engine 14 (e.g., with a motor, an independently driven actuator, etc.). According to an exemplary embodiment, the axis is elevated from the frame 12 at an angle in the range of five degrees to twenty degrees. In other embodiments, the axis is elevated by less than five degrees (e.g., four degrees, three degrees, etc.) or greater than twenty degrees (e.g., twenty-five degrees, thirty degrees, etc.). In an alternative embodiment, the vehicle 10 includes an actuator positioned to facilitate selectively adjusting the axis to a desired or target angle (e.g., manually in response to an operator input/command, automatically according to a control scheme, etc.).

As shown in FIG. 2, the mixing drum 52 of the drum assembly 50 includes an inlet, shown as hopper 56, and an outlet, shown as chute 58. According to an exemplary embodiment, the mixing drum 52 is configured to receive a mixture, such as a concrete mixture (e.g., cementitious material, aggregate, sand, etc.), with the hopper 56. The mixing drum 52 may additionally include an injection port. The injection port may provide access into the interior of the mixing drum 52 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port includes an injection valve that facilitates injecting the water and/or the chemicals from a fluid reservoir (e.g., a water tank, etc.) into the mixing drum 52 to interact with the mixture, while preventing the mixture within the mixing drum 52 from exiting the mixing drum 52 through the injection port. The mixing drum 52 may include a mixing element (e.g., fins, etc.) positioned within the interior thereof. The mixing element may be configured to (i) agitate the contents of mixture within the mixing drum 52 when the mixing drum 52 is rotated by the drum drive system 54 in a first direction (e.g., counterclockwise, clockwise, etc.) and (ii) drive the mixture within the mixing drum 52 out through the chute 58 when the mixing drum 52 is rotated by the drum drive system 54 in an opposing second direction (e.g., clockwise, counterclockwise, etc.). The chute 58 may include an actuator positioned such that the chute 58 is selectively pivotable to reposition the chute 58 (e.g., vertically, laterally, etc.) and therefore an angle at which the mixture is expelled from the mixing drum 52.

According to the exemplary embodiments shown in FIG. 3, the vehicle 10 is configured as a single rear axle quint fire truck. In other embodiments, the vehicle 10 is configured as a tandem rear axles quint fire truck. In still other embodiments, the vehicle 10 is configured as another type of fire apparatus such as a tiller fire truck, an aerial platform fire truck, a mid-mount fire truck, etc. As shown in FIG. 3, the rear assembly 30 includes stabilizers, shown as outriggers 60, and an aerial assembly, shown as ladder assembly 70. The outriggers 60 may be selectively extended from each lateral side and/or rear of the rear assembly 30 to provide increased stability while the vehicle 10 is stationary and the ladder assembly 70 is in use (e.g., extended from the vehicle 10, etc.). The rear assembly 30 further includes various compartments, cabinets, etc. that may be selectively opened and/or accessed for storage and/or component inspection, maintenance, and/or replacement.

As shown in FIG. 3, the ladder assembly 70 includes a plurality of ladder sections, shown as ladder sections 72, that are slidably coupled together such that the ladder sections 72 are extendable and retractable. The ladder assembly 70 further includes a base platform, shown as turntable 74, positioned at the base or proximal end of the ladder sections 72. The turntable 74 is configured to rotate about a vertical axis such that the ladder sections 72 may be selectively pivoted about the vertical axis (e.g., up to 360 degrees, etc.). As shown in FIG. 3, the ladder assembly 70 includes an implement, shown as water turret 76, coupled to the distal end of the ladder sections 72. The water turret 76 is configured to facilitate expelling water and/or a fire suppressing agent (e.g., foam, etc.) from a water storage tank and/or agent tank onboard the vehicle 10 and/or from an external water source (e.g., a fire hydrant, a separate water truck, etc.). In other embodiments, the ladder assembly 70 does not include the water turret 76. In such embodiments, the ladder assembly 70 may include an aerial platform coupled to the distal end of the ladder sections 72.

According to the exemplary embodiments shown in FIG. 4, the vehicle 10 is configured as an airport rescue fire fighting ("ARFF") truck. In other embodiments, the vehicle 10 is still another type of fire apparatus. As shown in FIG. 4, the rear assembly 30 include compartments, shows as compartments 80. The compartments 80 may be selectively opened to access components of the vehicle 10. As shown in FIG. 4, the rear assembly 30 includes a pump system (e.g., an ultra-high-pressure pump system, etc.), shown as pump system 90, disposed within the compartments 80 of the rear assembly 30. The pump system 90 may include a high pressure pump and/or a low pressure pump coupled to a water tank 92 and/or an agent tank 94. The pump system 90 is configured to pump water and/or a fire suppressing agent from the water tank 92 and the agent tank 94, respectively, to an implement, shown as water turret 96, coupled to the front end of the cab 20.

Figure 5:
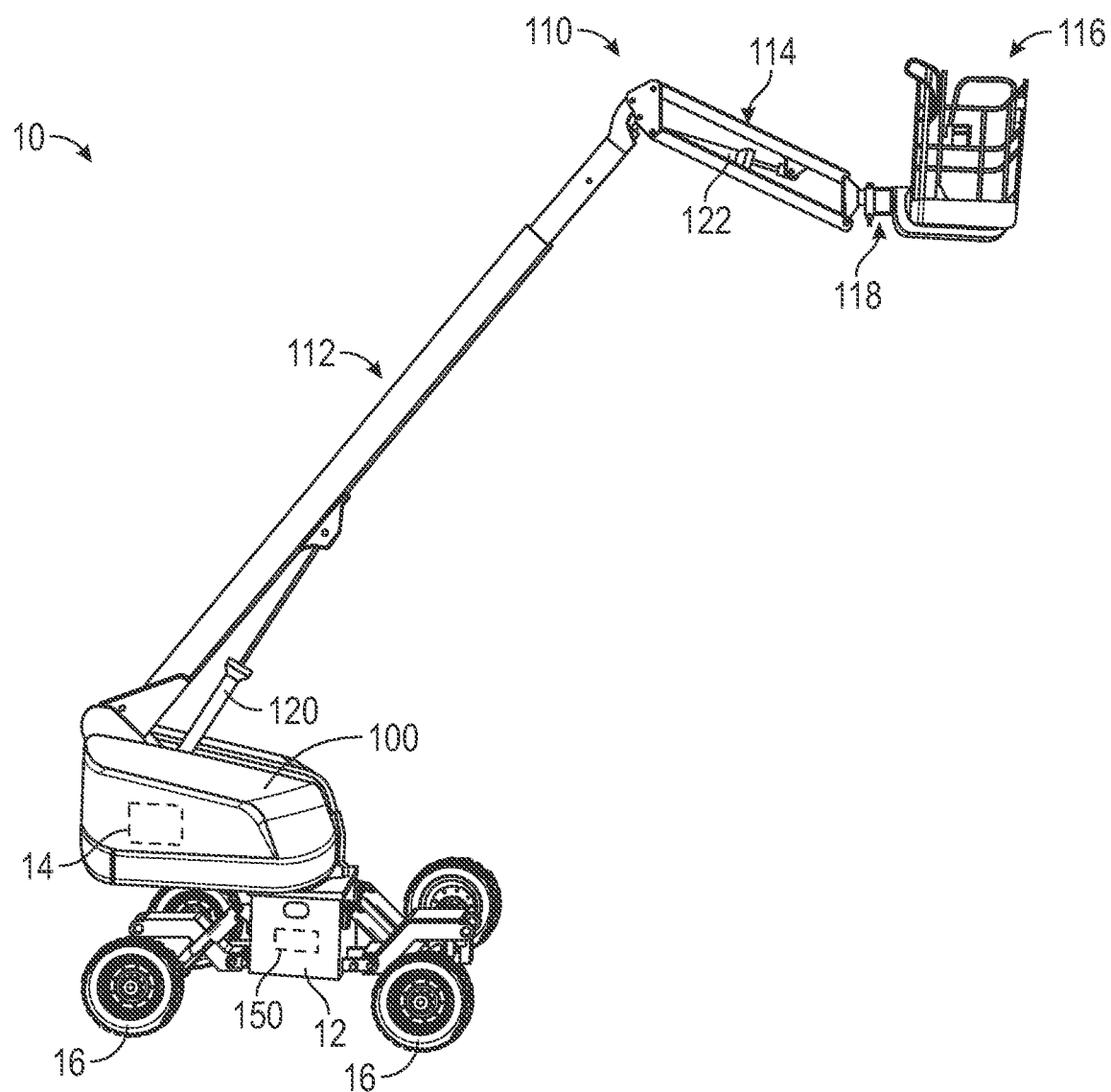
FIG. 5 is a perspective view of a lift vehicle, according to an exemplary embodiment.

According to the exemplary embodiment shown in FIG. 5, the vehicle 10 is configured as a lift device or machine (e.g., a boom lift, etc.). In other embodiments, the vehicle 10 is another type of vehicle (e.g., a skid-loader, a telehandler, a scissor lift, a fork lift, a boom truck, a plow truck, a military vehicle, etc.). As shown in FIG. 5, the frame 12 supports a rotatable structure, shown as turntable 100, and a boom assembly, shown as boom 110. According to an exemplary embodiment, the turntable 100 is rotatable relative to the frame 12. According to an exemplary embodiment, the turntable 100 includes a counterweight positioned at a rear of the turntable 100. In other embodiments, the counterweight is otherwise positioned and/or at least a portion of the weight thereof is otherwise distributed throughout the vehicle 10 (e.g., on the frame 12, on a portion of the boom 110, etc.).

As shown in FIG. 5, the boom 110 includes a first boom section, shown as lower boom 112, and a second boom section, shown as upper boom 114. In other embodiments, the boom 110 includes a different number and/or arrangement of boom sections (e.g., one, three, etc.). According to an exemplary embodiment, the boom 110 is an articulating boom assembly. In one embodiment, the upper boom 114 is shorter in length than lower boom 112. In other embodiments, the upper boom 114 is longer in length than the lower boom 112. According to another exemplary embodiment, the boom 110 is a telescopic, articulating boom assembly. By way of example, the upper boom 114 and/or the lower boom 112 may include a plurality of telescoping boom sections that are configured to extend and retract along a longitudinal centerline thereof to selectively increase and decrease a length of the boom 110.

As shown in FIG. 5, the lower boom 112 has a lower end pivotally coupled (e.g., pinned, etc.) to the turntable 100 at a joint or lower boom pivot point. The boom 110 includes a first actuator (e.g., pneumatic cylinder, electric actuator, hydraulic cylinder, etc.), shown as lower lift cylinder 120. The lower lift cylinder 120 has a first end coupled to the turntable 100 and an opposing second end coupled to the lower boom 112. According to an exemplary embodiment, the lower lift cylinder 120 is positioned to raise and lower the lower boom 112 relative to the turntable 100 about the lower boom pivot point.

As shown in FIG. 5, the upper boom 114 has a lower end pivotally coupled (e.g., pinned, etc.) to an upper end of the lower boom 112 at a joint or upper boom pivot point. The boom 110 includes an implement, shown as platform assembly 116, coupled to an upper end of the upper boom 114 with an extension arm, shown as jib arm 118. In some embodiments, the jib arm 118 is configured to facilitate pivoting the platform assembly 116 about a lateral axis (e.g., pivot the platform assembly 116 up and down, etc.). In some embodiments, the jib arm 118 is configured to facilitate pivoting the platform assembly 116 about a vertical axis (e.g., pivot the platform assembly 116 left and right, etc.). In some embodiments, the jib arm 118 is configured to facilitate extending and retracting the platform assembly 116 relative to the upper boom 114. As shown in FIG. 5, the boom 110 includes a second actuator (e.g., pneumatic cylinder, electric actuator, hydraulic cylinder, etc.), shown as upper lift cylinder 122. According to an exemplary embodiment, the upper lift cylinder 122 is positioned to actuate (e.g., lift, rotate, elevate, etc.) the upper boom 114 and the platform assembly 116 relative to the lower boom 112 about the upper boom pivot point.

According to an exemplary embodiment, the platform assembly 116 is a structure that is particularly configured to support one or more workers. In some embodiments, the platform assembly 116 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 116 includes a control panel (e.g., the user I/O device 200, a removable or detachable control panel, etc.) to control operation of the vehicle 10 (e.g., the turntable 100, the boom 110, etc.) from the platform assembly 116 and/or remotely therefrom. In some embodiments, the control panel (e.g., the user I/O device 200, etc.) is additionally or alternatively coupled (e.g., detachably coupled, etc.) to the frame 12 and/or the turntable 100. In other embodiments, the platform assembly 116 includes or is replaced with an accessory and/or tool (e.g., forklift forks, etc.).

Figure 6:
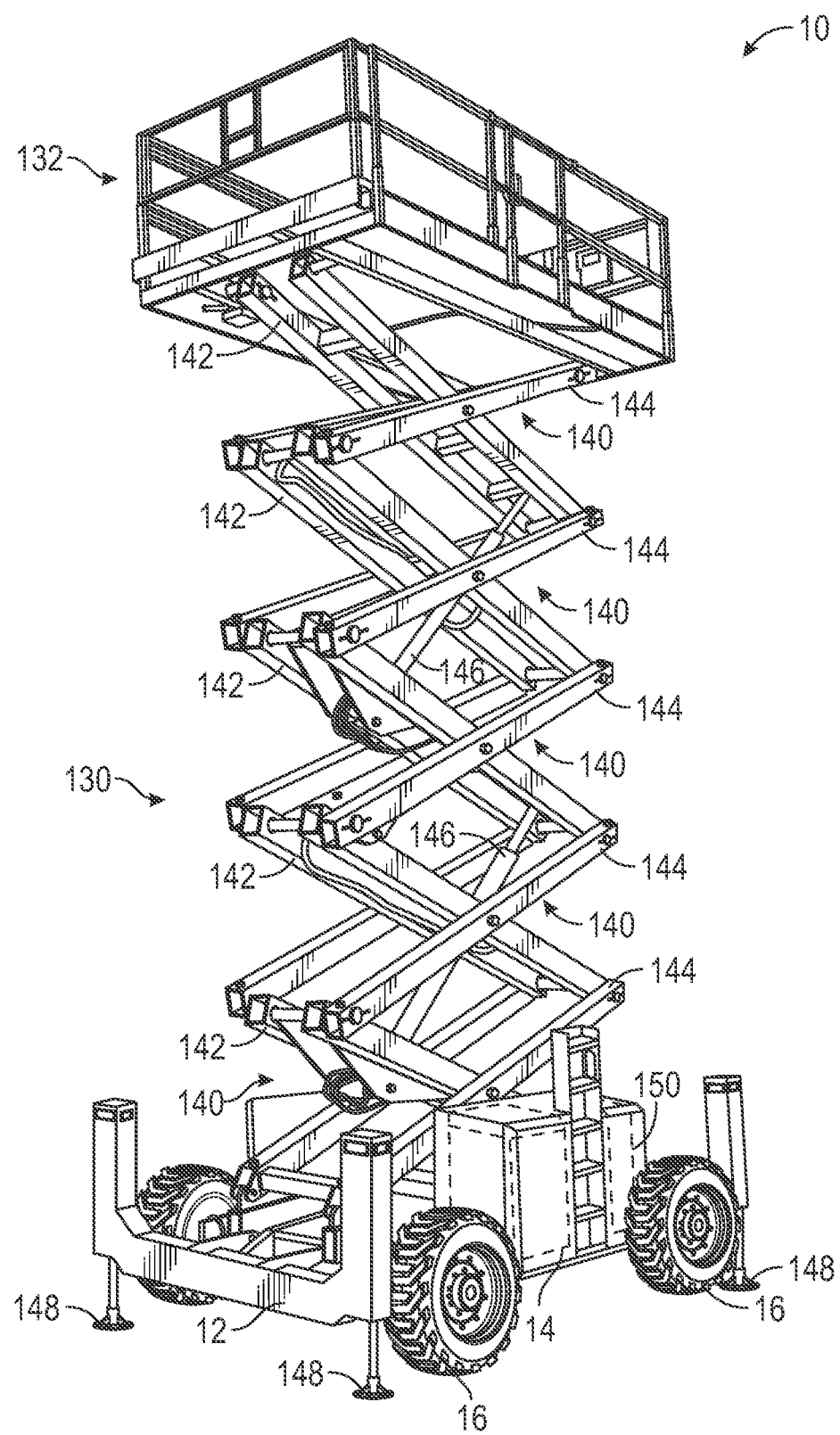
FIG. 6 is a perspective view of a lift vehicle, according to another exemplary embodiment.

According to the exemplary embodiment shown in FIG. 6, the vehicle 10 is configured as a lift device or machine (e.g., a scissor lift, etc.). As shown in FIG. 6, the vehicle 10 includes a lift system (e.g., a scissor assembly, etc.), shown as lift assembly 130, that couples the frame 12 to a platform, shown as platform 132. The frame 12 supports the lift assembly 130 and the platform 132, both of which are disposed directly above the frame 12. In use, the lift assembly 130 extends and retracts to raise and lower the platform 132 relative to the frame 12 between a lowered position and a raised position.

As shown in FIG. 6, the vehicle 10 includes one or more actuators, shown as leveling actuators 148, coupled to each corner of the frame 12. According to an exemplary embodiment, the leveling actuators 148 extend and retract vertically between a stored position and a deployed position. In the stored position, the leveling actuators 148 are raised and do not contact the ground. In the deployed position, the leveling actuators 148 contact the ground, lifting the frame 12. The length of each of the leveling actuators 148 in their respective deployed positions may be varied to adjust the pitch (i.e., rotational position about a lateral axis) and the roll (i.e., rotational position about a longitudinal axis) of the frame 12. Accordingly, the lengths of the leveling actuators 148 in their respective deployed positions may be adjusted such that the frame 12 is leveled with respect to the direction of gravity, even on uneven or sloped terrains. The leveling actuators 148 may additionally lift the wheel and tire assemblies 16 off the ground, preventing inadvertent driving of the vehicle 10. In other embodiments, the vehicle 10 does not include the leveling actuators 148.

As shown in FIG. 6, the lift assembly 130 includes a number of subassemblies, shown as scissor layers 140. Each of the scissor layers 140 includes a first member, shown as inner member 142, and a second member, shown as outer member 144. In each scissor layer 140, the outer member 144 receives the inner member 142. The inner member 142 is pivotally coupled to the outer member 144 near the centers of both the inner member 142 and the outer member 144. Accordingly, the inner members 142 pivot relative to the outer members 144 about a lateral axis. The scissor layers 140 are stacked atop one another to form the lift assembly 130. Each inner member 142 and each outer member 144 has a top end and a bottom end. The bottom end of each inner member 142 is pivotally coupled to the top end of the outer member 144 immediately below it, and the bottom end of each outer member 144 is pivotally coupled to the top end of the inner member 142 immediately below it. Accordingly, each of the scissor layers 140 is coupled to one another such that movement of one scissor layer 140 causes a similar movement in all of the other scissor layers 140. The bottom ends of the inner member 142 and the outer member 144 belonging to the lowermost of the scissor layers 140 are coupled to the frame 12. The top ends of the inner member 142 and the outer member 144 belonging to the uppermost of the scissor layers 140 are coupled to the platform 132. Scissor layers 140 may be added to or removed from the lift assembly 130 to increase or decrease, respectively, the maximum height that the platform 132 is configured to reach.

As shown in FIG. 6, the lift assembly 130 includes one or more actuators (e.g., hydraulic cylinders, pneumatic cylinders, motor-driven leadscrews, etc.), shown as lift actuators 66, that are configured to extend and retract the lift assembly 14. The lift actuators 66 are pivotally coupled to an inner member 142 at one end and pivotally coupled to another inner member 142 at the opposite end. These inner members 142 belong to a first scissor layer 140 and a second scissor layer 140 that are separated by a third scissor layer 140. In other embodiments, the lift assembly 130 includes more or fewer lift actuators 146 and/or the lift actuators 146 are otherwise arranged. The lift actuators 146 are configured to actuate the lift assembly 130 to selectively reposition the platform 132 between the lowered position where the platform 132 is proximate the frame 12 and the raised position where the platform 132 is at an elevated height. In some embodiments, extension of the lift actuators 146 moves the platform 132 vertically upward (extending the lift assembly 130), and retraction of the linear actuators moves the platform 132 vertically downward (retracting the lift assembly 130). In other embodiments, extension of the lift actuators 146 retracts the lift assembly 130, and retraction of the lift actuators 146 extends the lift assembly 130. In some embodiments, the outer members 144 are approximately parallel and/or contacting one another when with the lift assembly 130 in a stored position. The vehicle 10 may include various components to drive the lift actuators 146 (e.g., pumps, valves, compressors, motors, batteries, voltage regulators, etc.).

Figure 7:
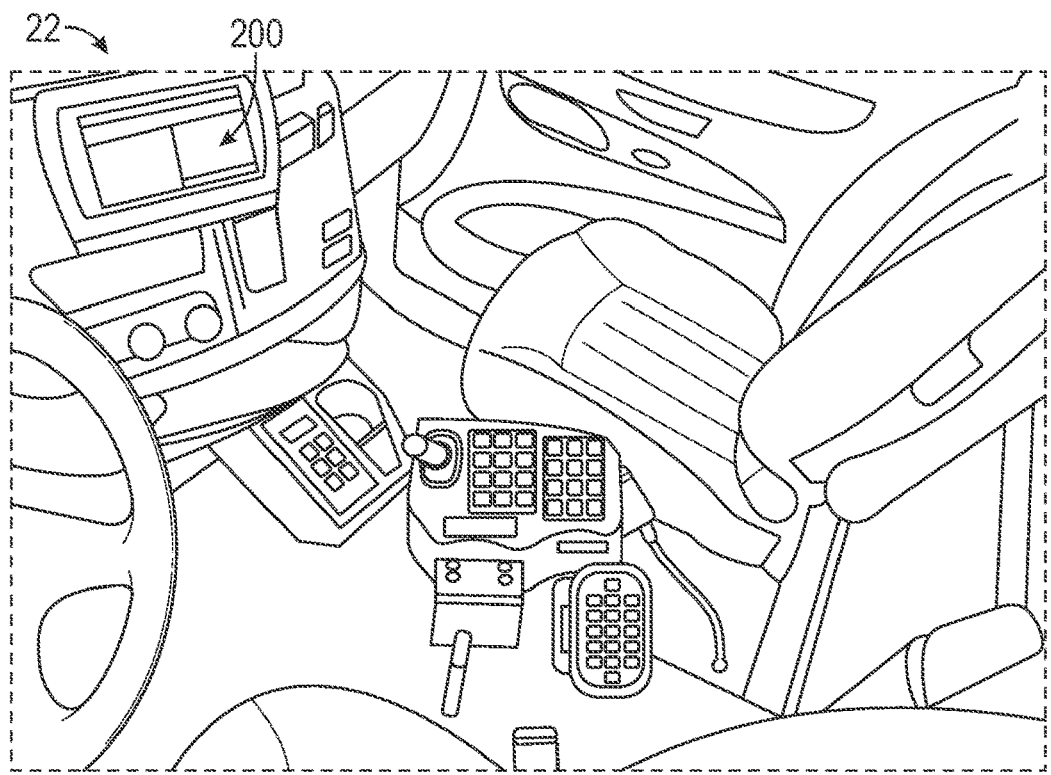
FIG. 7 is an interior view of a vehicle having a portable user input/output device, according to an exemplary embodiment.
Figure 8:
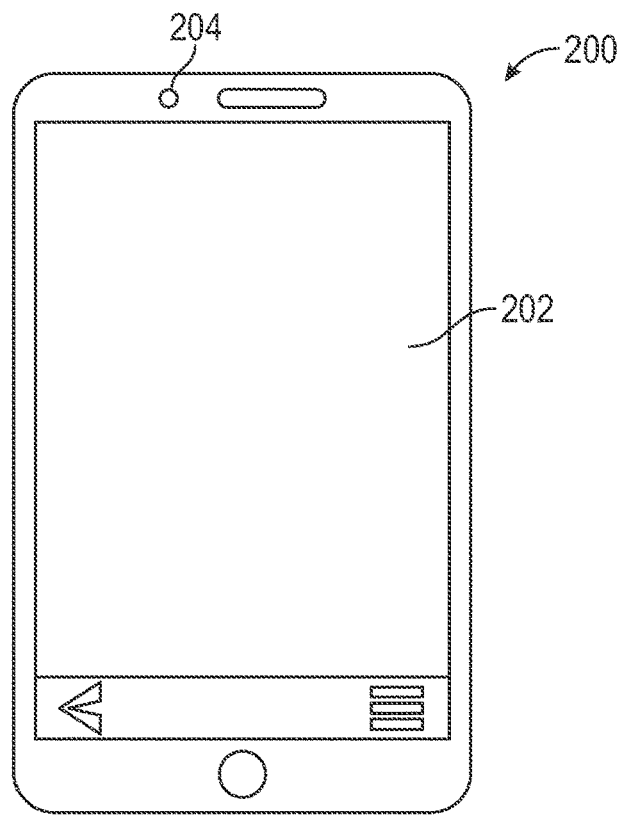
FIG. 8 is detailed view of the portable user input/output device of FIG. 6, according to an exemplary embodiment.
Figure 9:
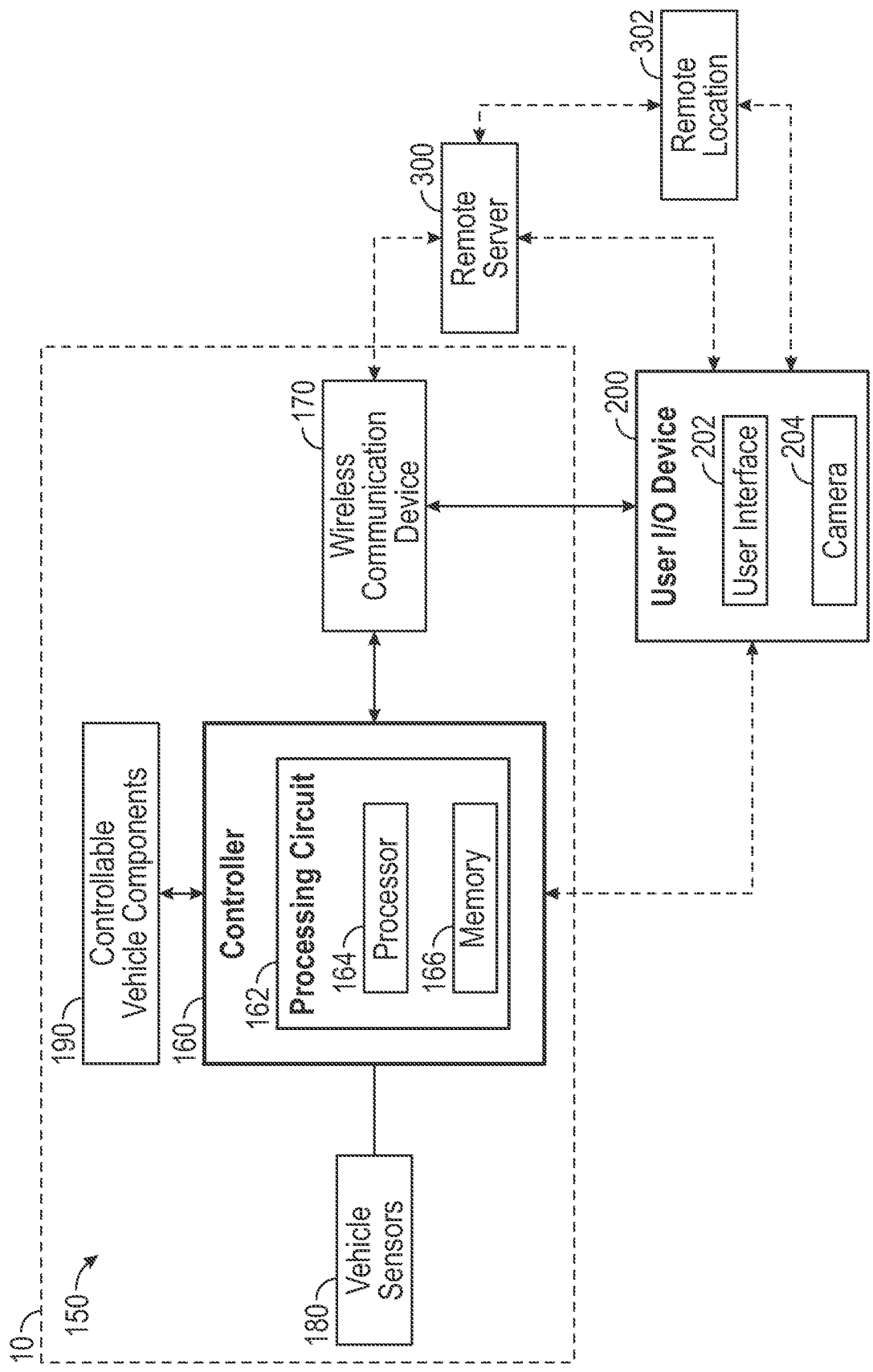
FIG. 9 is a schematic diagram of a control system of a vehicle, according to an exemplary embodiment.

As shown in FIG. 7, the user I/O device 200 is positioned within the interior 22 of the cab 20. As shown in FIG. 8, the user I/O device 200 is a portable electronic device (e.g., such as a table, laptop, smartphone, etc.) such that user I/O device 200 may be removed from the interior 22 of the cab 20, from the platform 116 of the boom 110, and/or from the platform 132 of the lift assembly 130 (or another portion of the vehicle 10 where the user I/O device 200 may otherwise be detachably coupled). As shown in FIGS. 8 and 9, user I/O device 200 has an interface, shown a display screen 202, and a camera device, shown as camera 204. The display screen 202 may be configured to provide a graphical user interface ("GUI") to an operator thereof and facilitate receiving touch inputs or commands. The camera 204 may be configured to capture still images, capture video, facilitate component detection, and/or facilitate augmented reality by acquiring camera/image data of a scene (e.g., an area of interest, etc.).

According to the exemplary embodiment shown in FIG. 9, the control system 150 for the vehicle 10 includes a controller, shown as controller 160. In one embodiment, the controller 160 is configured to selectively engage, selectively disengage, control, and/or otherwise communicate with components of the vehicle 10. As shown in FIG. 8, the controller 160 is coupled to a wireless communication device 170, vehicle sensors 180, controllable vehicle components 190, the user I/O device 200, a remote server 300, and a remote location 302 (e.g., a remote computer or device, etc.). In other embodiments, the controller 160 is coupled to more or fewer components.

According to an exemplary embodiment, the wireless communication device 170 is configured to facilitate wireless communication between the controller 160, the user I/O device 200 (e.g., a wireless transceiver thereof, etc.), and/or the remote server 300. The wireless communication device 170 may be a standalone component or integrated into the controller 160. The wireless communication device 170 may employ any suitable wireless communication protocol (e.g., Wi-Fi, cellular, radio, Bluetooth, near-field communication, etc.) to facilitate wireless communication between the controller 160 and the user I/O device 200 and/or the remote server 300. In some embodiments, the user I/O device 200 is capable of being selectively directly coupled to the controller 160 with a wired connection inside the interior 22 of the cab 20.

As shown in FIG. 2, the vehicle sensors 180 are variously positioned about the vehicle 10. While the vehicle sensors 180 are only shown in FIG. 2, it should be understood that the vehicle 10 in FIGS. 1 and 3-6, may additionally include the vehicle sensors 180. The vehicle sensors 180 are configured to facilitate monitoring operating characteristics (e.g., position, speed, etc.) of various components of the vehicle 10. The controllable vehicle components 190 may include the engine 14, the wheel and tire assemblies 16 (e.g., via steering actuators, drive actuators, etc.), the tailgate 42 (e.g., the tailgate actuators 43, etc.), the lift assembly 44 (e.g., the lift arm actuators 46, the articulation actuators 48, etc.), the drum assembly 50 (e.g., the drum drive system 54, the actuator of the chute 58, etc.), the outriggers 60, the ladder assembly 70 (e.g., the ladder sections 72, the turntable 74, the water turret 76, etc.), the pump system 90 (e.g., a pump thereof, the water turret 96, etc.), the turntable 100, the boom 110 (e.g., the jib arm 118, the lower lift cylinder 120, the upper lift cylinder 122, the tool or implement, etc.), and/or the lift assembly 130 (e.g., the lift actuators 146, the leveling actuators 148, etc.), among still other controllable vehicle components.

The controller 160 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 9, the controller 160 includes a processing circuit 162 having a processor 164 and a memory 166. The processing circuit 162 may include an ASIC, one or more FPGAs, a DSP, circuits containing one or more processing components, circuitry for supporting a microprocessor, a group of processing components, or other suitable electronic processing components. In some embodiments, the processor 164 is configured to execute computer code stored in the memory 166 to facilitate the activities described herein. The memory 166 may be any volatile or non-volatile computer-readable storage medium capable of storing data or computer code relating to the activities described herein. According to an exemplary embodiment, the memory 166 includes computer code modules (e.g., executable code, object code, source code, script code, machine code, etc.) configured for execution by the processor 164. It should be understood that the user I/O device 200 may similarly include processing components (e.g., a processing circuit, a processor, a memory, etc.) to facilitate the activities described herein. The user I/O device 200 may further run an application ("app") stored thereon to facilitate the activities described herein.

The controller 160 may be configured to monitor performance, status, characteristics, etc. of components of the vehicle 10 in real time based on data received from the vehicle sensors 180 (e.g., for component failure detection, etc.). In some embodiments, the controller 160 is configured to transmit such data to the user I/O device 200 for display on the display screen 202 to an operator of the vehicle 10 and/or to the remote server 300 (e.g., via the wireless communication device 170, telematics communication, etc.). In some embodiments, the controller 160 is configured to perform diagnostics on such data to identify a status of components of the vehicle 10 as operational, faulty, or trending towards a fault (i.e., failing). The controller 160 may therefore be capable of detecting and/or predicting maintenance items and/or potential component failures of the vehicle 10. The controller 160 may thereafter provide an indication or notification of the status of the components to the user I/O device 200 for display on the display screen 202 and/or to the remote server 300. In some embodiments, the user I/O device 200 is additionally or alternatively configured to perform such diagnostics based on the data received from the controller 160 and then generate the indication of the status of the components on the display screen 202. The user I/O device 200 may therefore be capable of detecting and/or predicting maintenance items and/or potential component failures of the vehicle 10. In some embodiments, the remote server 300 is additionally or alternatively configured to perform such diagnostics based on the data received from the controller 160 (e.g., received directly from the controller 160, received indirectly from the controller 160 via the user I/O device 200, etc.) and then transmit the indication of the status of the components to the user I/O device 200 for display on the display screen 202. The remote server 300 may therefore be capable of detecting and/or predicting maintenance items and/or potential component failures of the vehicle 10. In some embodiments, the status of the components is sent (e.g., by the remote server 300, the user I/O device 200, etc.) to the remote location 302 (e.g., a command center, a vehicle hub, a fleet manager, owner's place of business, etc.) for further analysis.

In some embodiments, the controller 160, the user I/O device 200, and/or the remote server 300 are configured to facilitate ordering a failed or failing component of the vehicle 10 in response to such a detection. By way of example, the user I/O device 200 may provide a component ordering interface to the operator of the vehicle 10 in response to a component of the vehicle 10 being identified as failed or failing (e.g., as determined by the controller 160, the user I/O device 200, the remote server 300, etc.). By way of another example, a computing device (e.g., a desktop computer, a laptop, etc.) at the remote location 302 may provide a component ordering interface to a fleet manager of the vehicle 10 or other suitable person in response to a component of the vehicle 10 being identified as failed or failing.

According to an exemplary embodiment, the portability of the user I/O device 200 facilitates providing troubleshooting and diagnosis right at the location of or in proximity of the issue (i.e., fault). This may advantageously prevent an operator from having to continually go back and forth between a display in the cab 20 and the area of concern, which can otherwise make troubleshooting troublesome and time consuming. By way of example, the user I/O device 200 may be configured to provide troubleshooting walk-throughs, schematics, manuals, and/or 3D models regarding the issue directly to the operator on the display screen 202 while positioned at the location of the issue (e.g., without the operator having to search or request such information to facilitate the diagnosis and/or troubleshooting, etc.). For example, the user I/O device 200 may be configured to provide step-by-step instructions on where the fault or issue is located on the vehicle 10, how to identify the component or components that are faulty once arriving at the location on the vehicle 10, and/or how to inspect, repair, recalibrate, and/or replace the faulty component. As another example, the user I/O device 200 may pull up the representations (e.g., schematics, models, etc.) of the failed component to help the operator locate the component on the vehicle 10. As yet another example, the user I/O device 200 may direct the operator to a location in the manual for the vehicle 10 associated with the type of fault or failed component.

In some embodiments, the user I/O device 200 is configured to facilitate automatic component detection. By way of example, the operator may position the user I/O device 200 such that the camera 204 is focused on and gathers data regarding a portion of the vehicle 10 or a specific component of the vehicle 10. The controller 160, the remote server 300, and/or the user I/O device 200 may interpret the data to detect what portion or component of the vehicle 10 at which the operator is directing the camera 204. The user I/O device 200 may thereafter provide schematics, 3D models, manuals, etc. for the detected area or component of the vehicle 10. Such automatic detection may additionally be used in the troubleshooting and diagnostic process to verify that the operator is at the location of the component fault (e.g., the operator may go to the location indicated and then scan the area he or she believes is the correct area of the fault, and the controller 160, the remote server 300, and/or the user I/O device 200 may verify the location/component is correct, etc.).

In some embodiments, the user I/O device 200 is configured to provide augmented reality to assist in the troubleshooting walkthroughs, diagnosis, maintenance, calibration, and/or replacement of components of the vehicle 10. By way of example, an operator may direct the camera 204 of the user I/O device 200 at an area of interest (e.g., a portion of the vehicle 10, a faulty component of the vehicle 10, etc.) such that a live display of the area of interest is provided on the display screen 202. The user I/O device 200 may thereafter provide detailed instructions on the display screen 202 over the live display on how to proceed. By way of example, the user I/O device 200 may highlight a faulty component on the display screen 202. The user I/O device 200 may also identify how to diagnose, calibrate, repair, or uninstall the faulty component by providing step-by-step instructions using augmented reality (e.g., which fasteners to remove, which connections to disconnect, which buttons or switches to engage or disengage, etc.).

The user I/O device 200 may also be used for navigation, calibration, and settings. By way of example, when a new component is installed or maintenance is performed thereon, the user I/O device 200 may be used to calibrate or recalibrate the component (e.g., sensors, actuators, etc.). By way of another example, the user I/O device 200 may facilitate an operator with adjusting various settings of the vehicle 10 and the components thereof (e.g., nominal positions, display characteristics, operator preferences, etc.). By way of yet another example, the user I/O device 200 may provide navigation or turn-by-turn driving instructions to an operator of the vehicle 10, as well as provide tracking functionality via communication with the remote server 300.

According to an exemplary embodiment, the user I/O device 200 is configured to facilitate an operator in providing commands to the controllable vehicle components 190 (e.g., the engine 14, the tailgate 42, the lift assembly, the drum assembly 50, the outriggers 60, the ladder assembly 70, the pump system 90, the turntable 100, the boom 110, etc.) and/or the vehicle sensors 180 of the vehicle 10. Such commands may be provided while an operator is within the cab 20 and/or external from the cab 20. By way of example, the operator of the vehicle 10 may be able to actuate the lift arm actuators 46 to raise and lower the lift assembly 44 with the user I/O device 200. By way of another example, the operator of the vehicle 10 may be able to actuate the tailgate actuators 43 to raise and lower the tailgate 42 with the user I/O device 200. By way of yet another example, the operator of the vehicle 10 may be able to control the speed and/or direction of the drum drive system 54, and thereby the mixing drum 52, with the user I/O device 200. By way of still another example, the operator of the vehicle 10 may be able to control the position of the chute 58 (e.g., by actuating the actuator thereof, etc.) with the user I/O device 200. By way of still another example, the operator of the vehicle 10 may be able to control extension and retraction of the outriggers 60, extension and retraction of the ladder sections 72, rotation of the turntable 74, and/or a direction at which the water turret 76 expels water and/or agent with the user I/O device 200. By way of still another example, the operator of the vehicle 10 may be able to control a speed of the pump of the pump system 90, a water-to-agent ratio provided by the pump system 90 and expelled by the water turret 96, and/or a direction at which the water turret 96 expels water and/or agent with the user I/O device 200. By way of still another example, the operator of the vehicle 10 may be able to control rotation of the turntable 100, the height and/or reach of the boom 110, and/or the position of the platform assembly 116 or other implement with the user I/O device 200. By way of still another example, the operator of the vehicle 10 may be able to control extension and retraction of the lift assembly 130 with the user I/O device 200. By way of still another example, the operator of the vehicle 10 may be able to control driving and steering the vehicle 10 remotely with the user I/O device 200. In some embodiments, the remote server 300 is configured to facilitate providing commands to the controllable vehicle components 190 and/or calibrating the vehicle sensors 180 of the vehicle 10 from a remote location 302 (e.g., directly, indirectly through the user I/O device 200, etc.).

In some embodiments, the user I/O device 200 is configured to provide augmented reality when an operator is controlling the controllable vehicle components 190 of the vehicle 10 with the user I/O device 200. By way of example, an operator may select a control interface used to control the lift assembly 44 with the user I/O device 200. Alternatively, the operator may direct the camera 204 at the lift assembly 44 and the user I/O device 200 may display a control interface for the lift assembly 44 or prompt the user with an option to display the control interface upon detecting the lift assembly 44 with the camera 204. Once controlling the lift assembly 44 (e.g., with the control interface, etc.), the operator may direct the camera 204 at the lift assembly 44 such that a real-time display of the lift assembly 44 is provided on the display screen 202. The user I/O device 200 may be configured to project an augmented reality display of the lift assembly 44 indicating where the lift arms 45 assembly should be (e.g., based on feedback from the actuators and/or position sensors of the lift arms 45, etc.) relative to its current position (e.g., the real time position captured by the camera 204, etc.). Therefore, such an overlay of the augmented reality position and the actual position of a controllable vehicle component 190 may indicate if the controllable vehicle component 190 is operating correctly and/or whether any of the vehicle sensors 180 (e.g., position sensors, etc.) are faulty.

The user I/O device 200 may be configured to implement a method for providing instructions to a user to fix a fault of the vehicle 10. The method may include providing a notification regarding a faulty component of the vehicle 10 on the user interface 202 of the user I/O device 200, providing an indication regarding a location of the faulty component on the user interface 202, acquiring image data from the camera 204 of the user I/O device 200 in response to the camera 204 being directed at the location, providing a live display on the user interface 202 regarding the location based on the image data, detecting the faulty component within the live display based on the image data, and providing instructions using augmented reality within the live display to facilitate addressing (e.g., inspecting, repairing, recalibrating, replacing, etc.) the faulty component. It should be understood that the above method may include additional or different steps in accordance with the disclosure provided herein with respect to the functions of the controller 160, the user I/O device 200, and/or the remote server 300.

Figure 11:
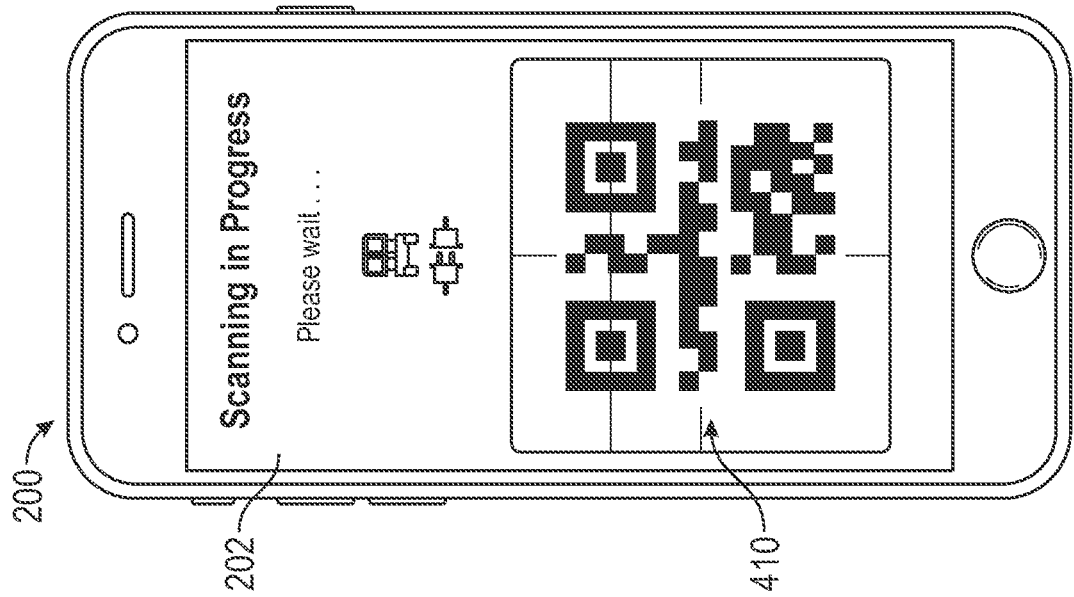
FIGS. 10-13 illustrate a method for connecting a portable user input/output device to a vehicle to permit remote control thereof, according to an exemplary embodiment.
Figure 10:
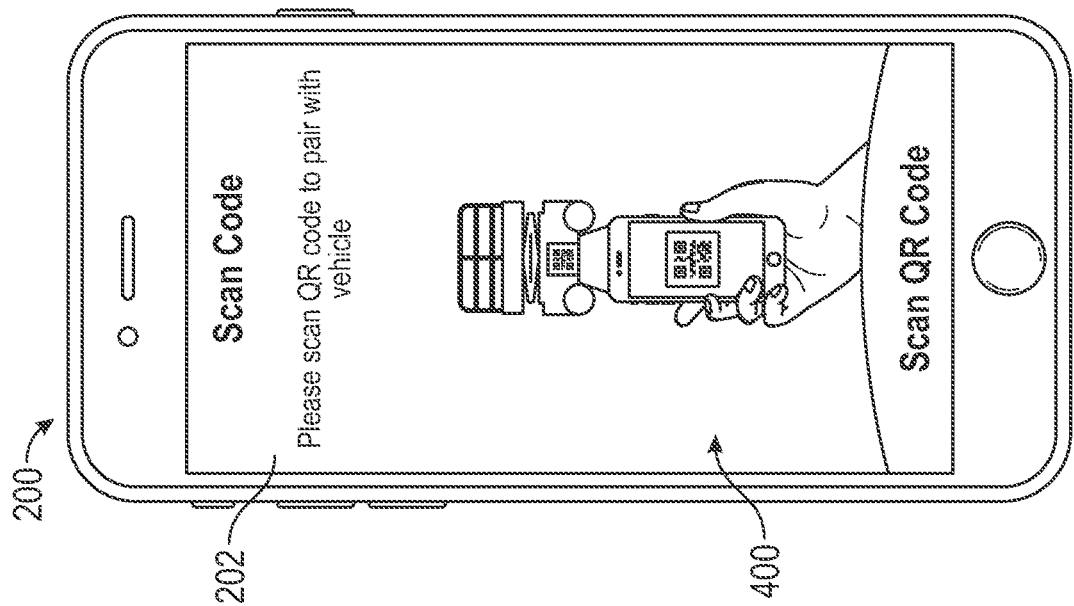

According to the exemplary embodiments shown in FIGS. 10-20, the user I/O device 200 is configured to provide various GUIs on the display 202 to facilitate connecting to and controlling operation of the vehicle 10 with the user I/O device 200. As shown in FIG. 10, a first GUI, shown as scan GUI 400, is presented to a user via the display 202 with instructions to scan an identifier on the vehicle 10 (e.g., a QR code, a barcode, a RFID tag, etc.) with the user I/O device 200 (e.g., via the camera 204, an RFID reader, etc.). As shown in FIG. 11, a second GUI, shown as analyzing GUI 410, is presented to the user via the display 202 indicating that the identifier is being scanned and/or analyzed. In some embodiments, the user I/O device 200 is configured to compare the scanned identifier to a prestored list of identifiers on the user I/O device 200 to determine whether the respective user device 200 is permitted or authorized to connect to the vehicle 10. In some embodiments, the user I/O device 200 is configured to transmit the scanned identifier to the remote server 300. In such embodiments, the remote server 300 may be configured to compare the scanned identifier to a prestored list of identifiers for the respective user device 200 to determine whether the respective user device 200 is permitted or authorized to connect to the vehicle 10. If the identifier is verified (i.e., the user is authorized to access the vehicle 10), the user I/O device 200 may connect to the vehicle 10. The connection may be established using any suitable short range or long range wireless communication protocol (e.g., Wi-Fi, cellular, radio, Bluetooth, near-field communication, etc.).

Figure 13:
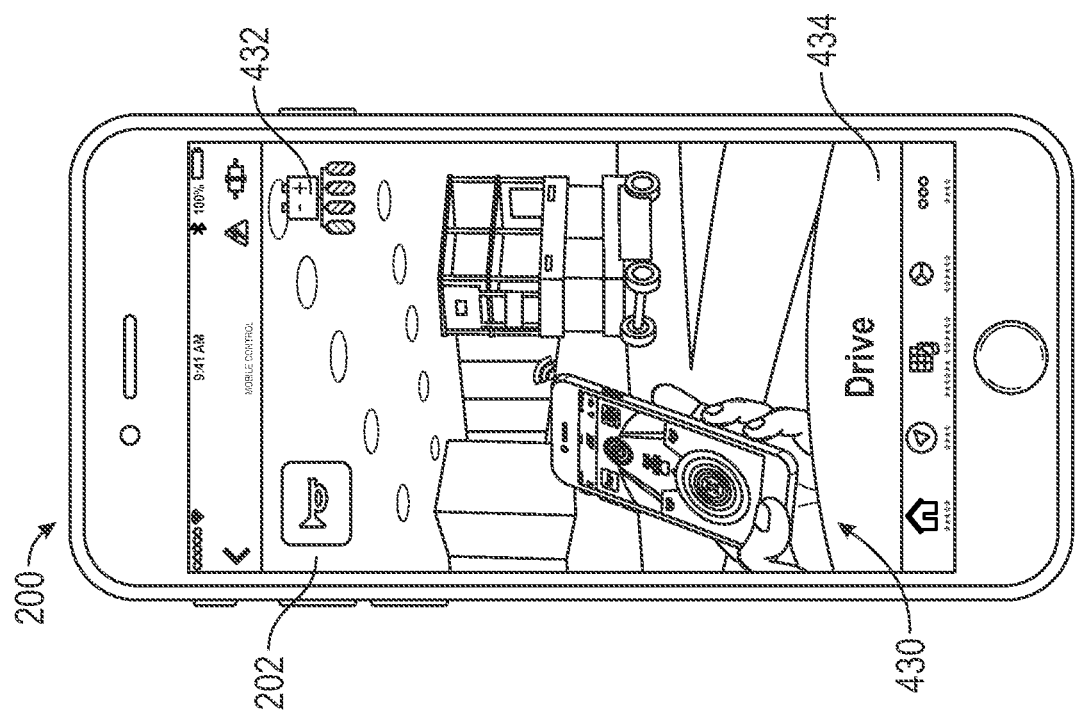
Figure 12:
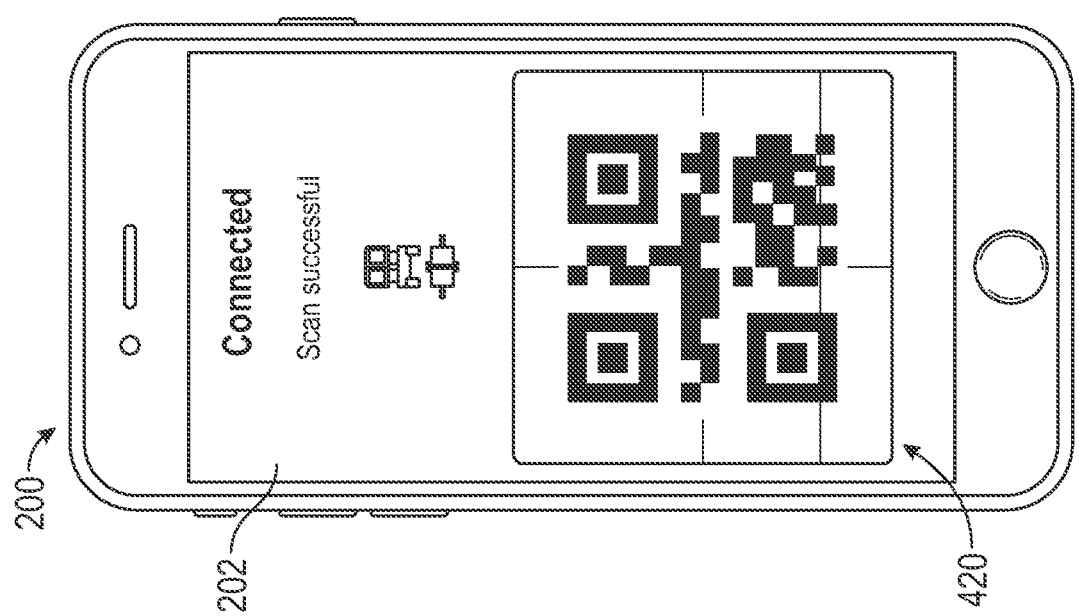

As shown in FIG. 12, a third GUI, shown as connected GUI 420, is presented to the user via the display 202 indicating that the user I/O device 200 is connected to the vehicle 10 (e.g., in response to the identifier being verified, being included in the prestored list of identifiers, etc.). It should be understood that the connection scheme described in connection with FIGS. 10-12 is one possible implementation for securely connecting the user I/O device 200 to the vehicle 10. Other connection schemes are possible such as digital signature schemes, multi-key encryption/authentication schemes, passcode schemes, etc. Once connection is completed, a fourth GUI, shown in FIG. 13 as status GUI 430, is presented to the user via the display 202. As shown in FIG. 13, the status GUI 430 provides a status portion, shown as status identifier 432, and a control portion, shown as control button 434. According to an exemplary embodiment, the status identifier 432 is configured to provide an indication of a status of one or more components of the vehicle 10 (e.g., a battery level, a battery health, a machine status, a fuel level, etc.). According to an exemplary embodiment, the control button 434 is configured to direct the user to a remote-control GUI.

Figure 14:
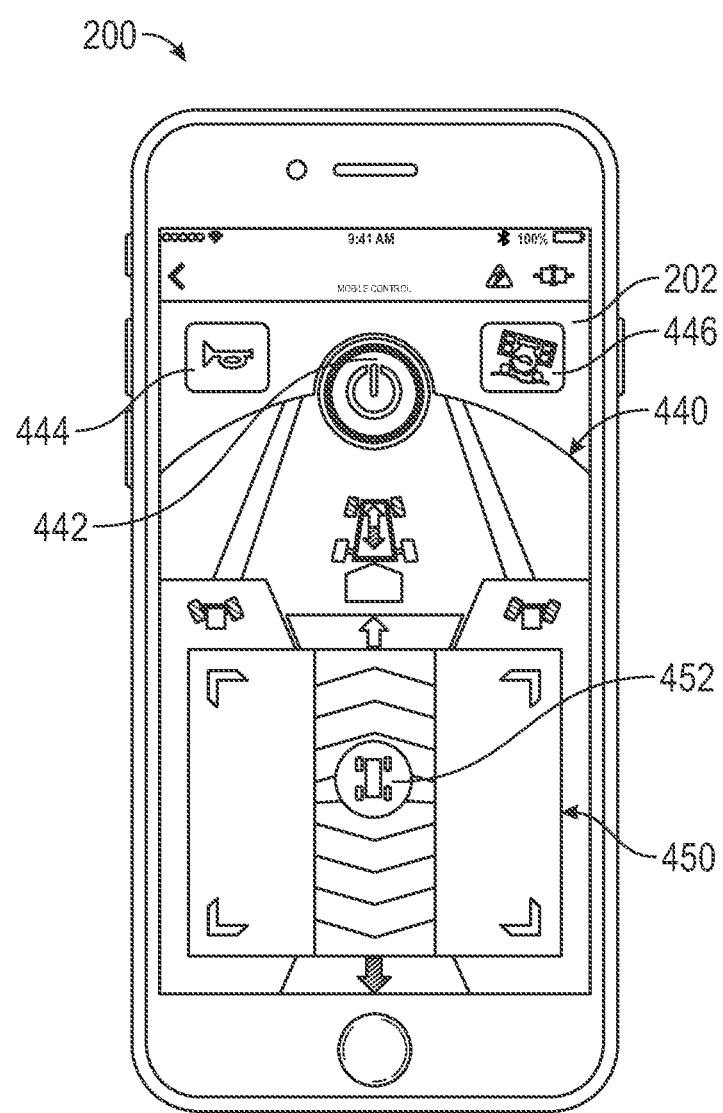

As shown in FIG. 14, a fifth GUI, shown as remote-control GUI 440, is presented to the user via the display 202 (in response to the user selecting the control button 434). The remote-control GUI 440 is configured to facilitate remotely controlling the controllable vehicle components 190 of the vehicle 10 with the user I/O device 200. By way of example, the remote-control GUI 440 may facilitate controlling the engine 14, the wheel and tire assemblies 16 (e.g., via steering actuators, drive actuators, etc.), the tailgate 42 (e.g., the tailgate actuators 43, etc.), the lift assembly 44 (e.g., the lift arm actuators 46, the articulation actuators 48, etc.), the drum assembly 50 (e.g., the drum drive system 54, the actuator of the chute 58, etc.), the outriggers 60, the ladder assembly 70 (e.g., the ladder sections 72, the turntable 74, the water turret 76, etc.), the pump system 90 (e.g., a pump thereof, the water turret 96, etc.), the turntable 100, the boom 110 (e.g., the jib arm 118, the lower lift cylinder 120, the upper lift cylinder 122, the tool or implement, etc.), and/or the lift assembly 130 (e.g., the lift actuators 146, the leveling actuators 148, etc.), among still other controllable components of the vehicle 10.

As shown in FIG. 14, the control GUI 440 includes a first button, shown as power button 442, a second button, shown as horn button 444, a third button, shown as speed toggle button 446, and an interface, shown as drive and steer operation trackpad 450. The power button 442 is configured to facilitate turning on and off the prime mover (e.g., the engine 14, etc.) of the vehicle 10. The horn button 444 is configured to facilitate activating and sounding a horn of the vehicle 10. The speed toggle button 446 is configured to facilitate toggling between speed modes of the vehicle 10. By way of example, the speed modes may include a low torque and high speed mode (rabbit mode), a high torque and low speed mode (turtle mode), and/or one or more intermediate modes. As shown in FIG. 14, the drive and steer operation trackpad 450 includes a repositionable button, shown as drive button 452, that is selectively repositionable within the drive and steer operation trackpad 450. According to an exemplary embodiment, repositioning the drive button 452 facilitates driving and turning the vehicle 10 remotely with the user I/O device 200. In some embodiments, the user I/O device 200 is configured to provide haptic feedback to the user of the user I/O device 200 when the drive button 452 interacts with a border of the drive and steer operation trackpad 450 (e.g., indicating a speed extreme, a turning extreme, etc.).

In some embodiments, the control GUI 440 provides additional or different control capabilities (e.g., controlling any of the controllable vehicle components 190, etc.). In some embodiments, the vehicle 10 includes a GPS chip that facilitates locating the vehicle 10 using the user I/O device 200 (e.g., "find my vehicle," etc.). In some embodiments, the user I/O device 200 includes a microphone that facilitates controlling various functions of the vehicle 10 using voice commands.

Figure 15:
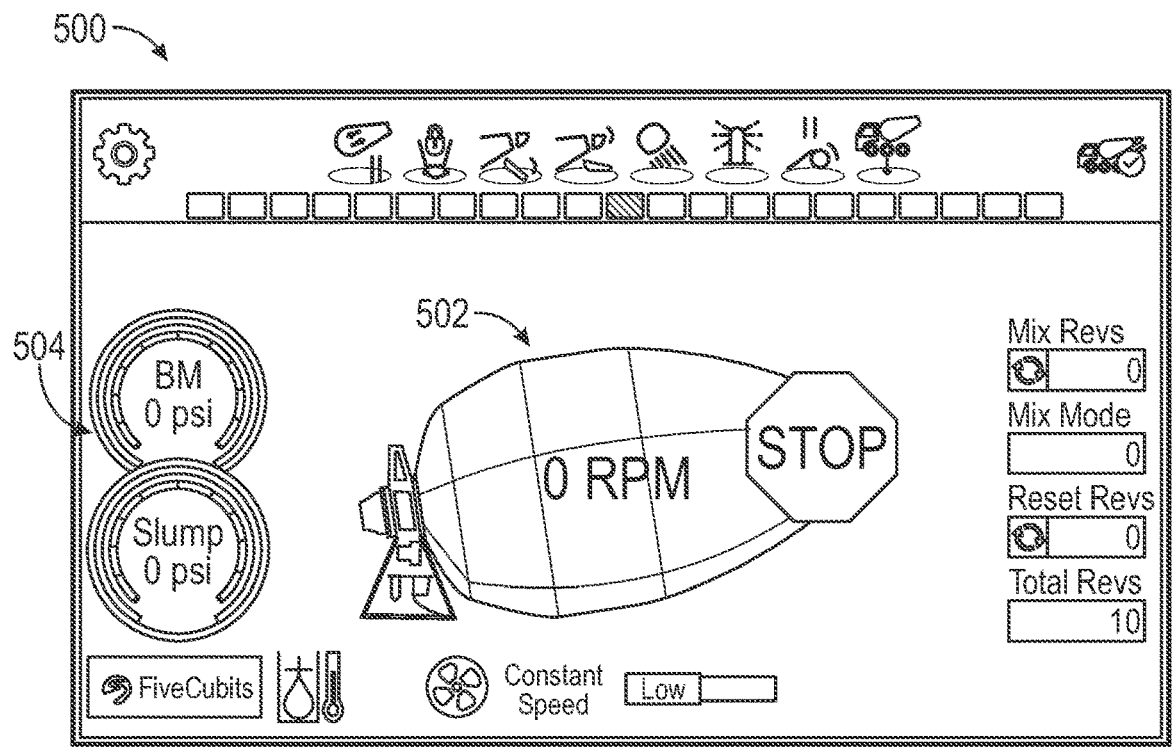
Figure 16:
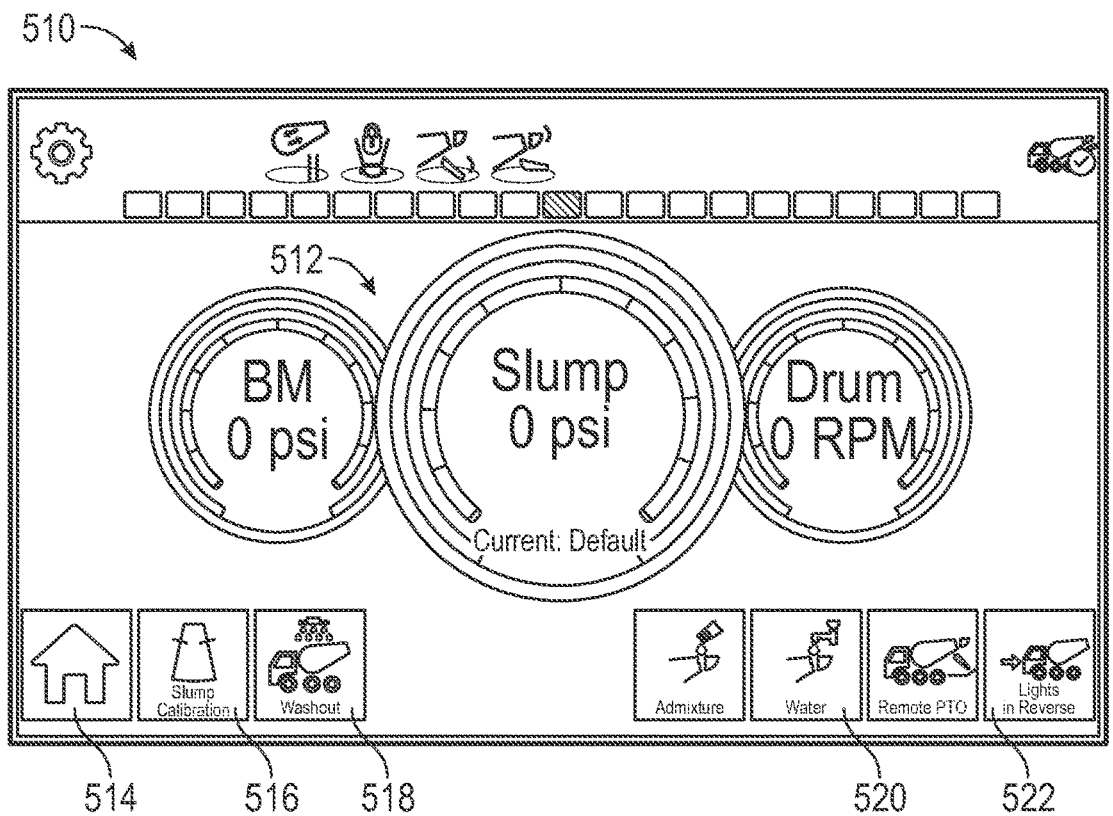
Figure 19:
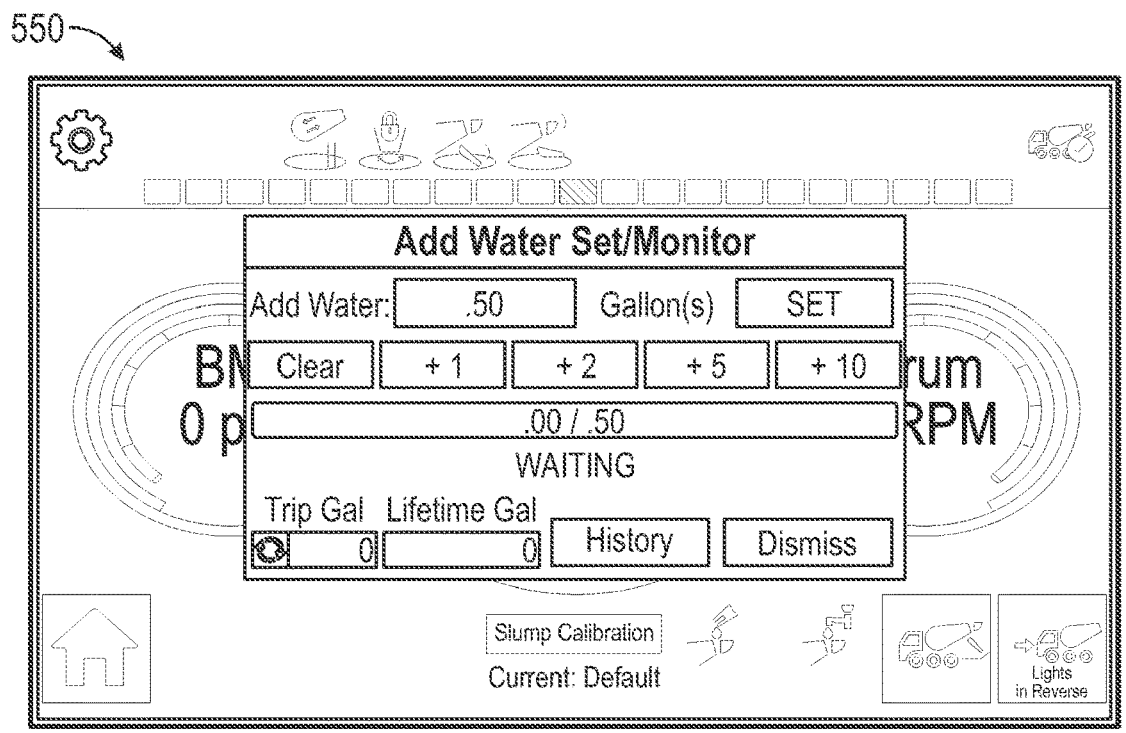
Figure 20:
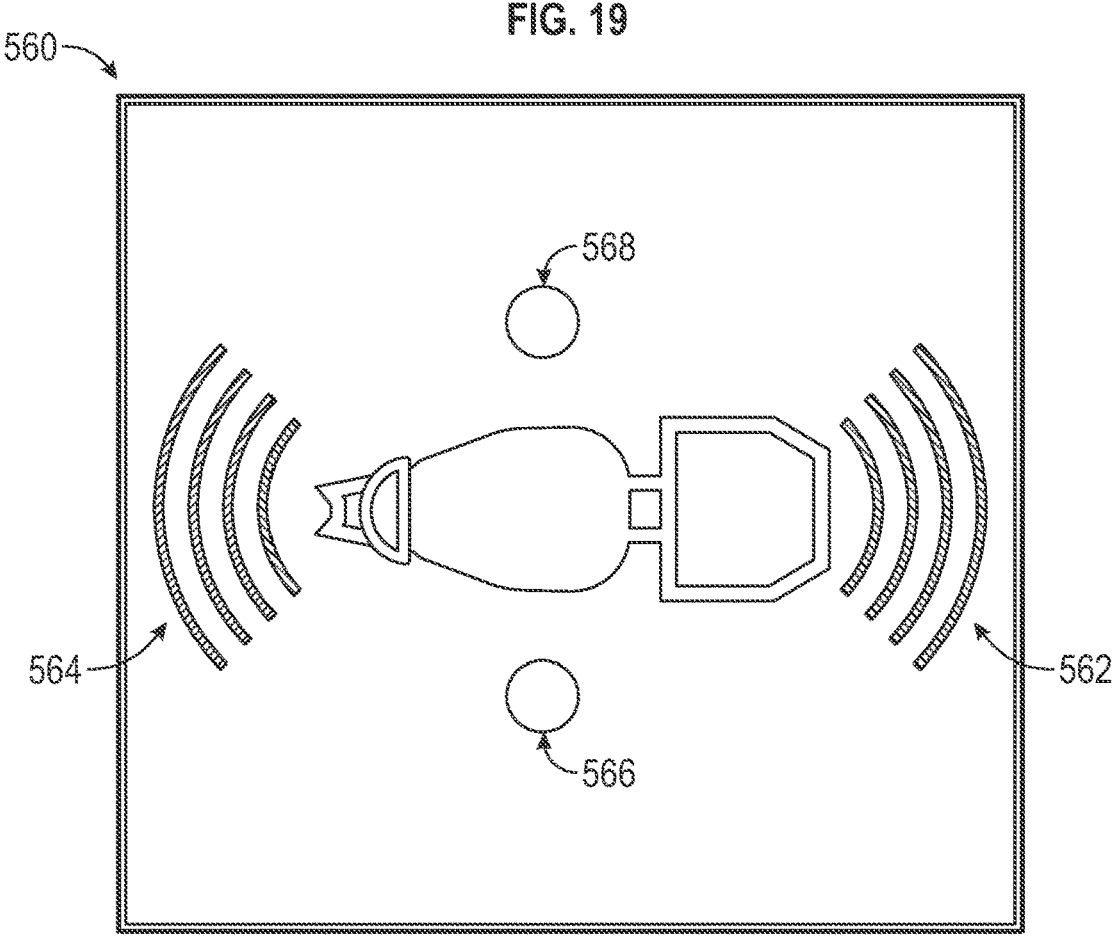

Referring now to FIGS. 15-20, various GUIs provided by the user I/O device 200 are shown for an embodiment where the vehicle 10 is configured as a concrete mixer truck. As shown in FIG. 15, a first GUI, shown as drum overview GUI 500, includes a drum status indicator 502 and a slump indicator 504. The drum status indicator 502 provides an indication of a speed of the mixing drum 52 of the vehicle 10. The slump indicator 504 provides an indication of pressure and slump measurements. In some embodiments, selecting the slump indicator 504 directs the user to a second GUI, shown in FIG. 16 as slump GUI 510. The slump GUI 510 includes a status indicator 512 that provides an indication of pressure, slump, and drum speed measurements. The slump GUI 510 further includes a home button 514, a slump calibration button 516, a washout button 518, a water button 520, and an object detection button 522. The home button 514 is configured to facilitate returning to the drum overview GUI 500.

Figures 17, 18:
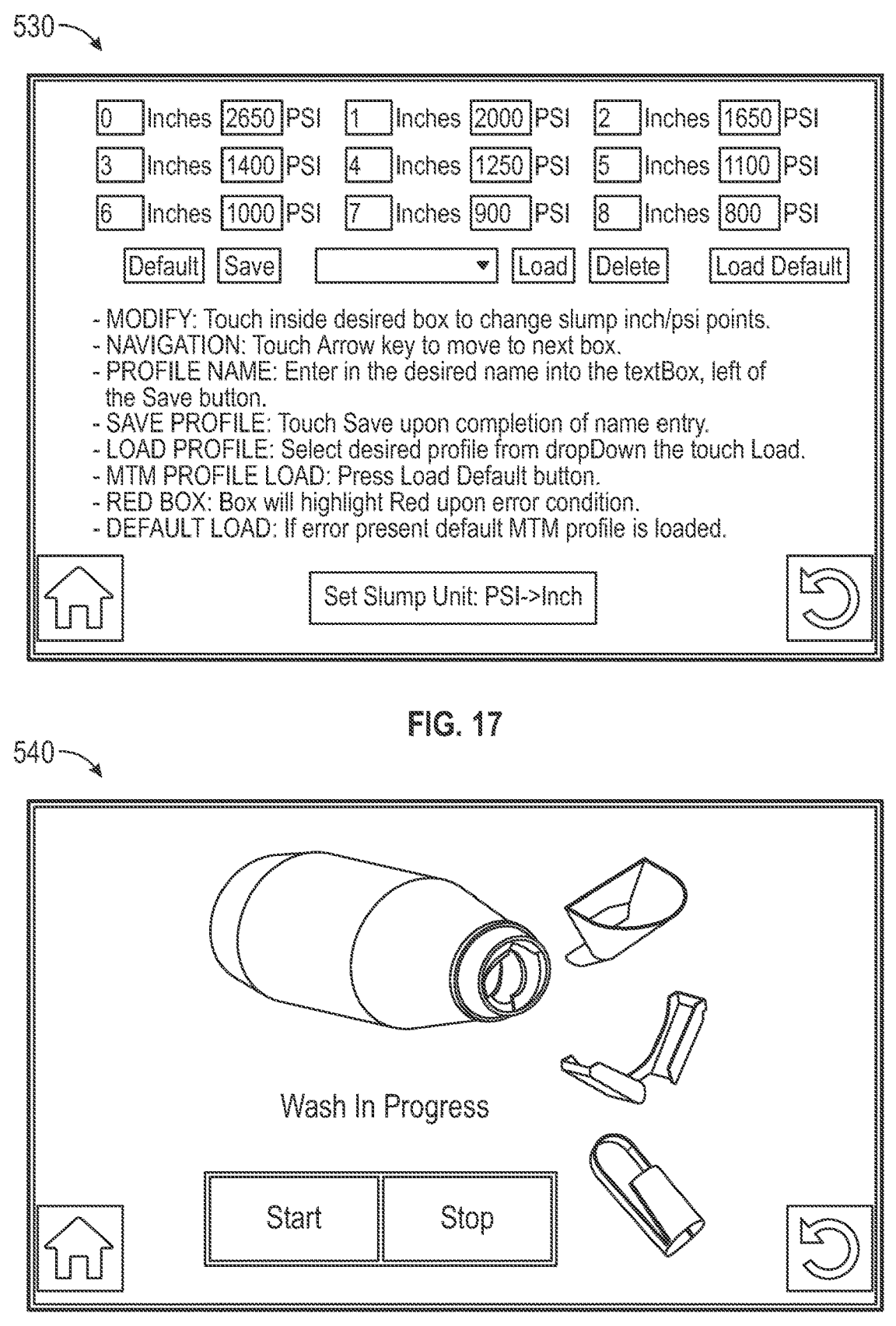

The slump calibration button 516 is configured to direct the user to a third GUI, shown in FIG. 17 as slump calibration GUI 530. According to an exemplary embodiment, the slump calibration GUI 530 facilitates designing a custom slump profile and/or loading a preexisting slump profile. The washout button 518 is configured to direct the user to a fourth GUI, shown in FIG. 18 as washout GUI 540. According to an exemplary embodiment, the washout GUI 540 facilitates initiating an automatic washout process within the mixing drum 52, the hopper 56, and the chute 58 to wash away concrete buildup after user thereof. The water button 520 is configured to direct the user to a fifth GUI, shown in FIG. 19 as water GUI 550. According to an exemplary embodiment, the water GUI 550 facilitates manually controlling an amount of water that is injected into the mixing drum 52 and/or manually setting an amount of water to be injected into the mixing drum 52 (e.g., over time, during a current trip, etc.). The object detection button 522 is configured to direct the user to a sixth GUI, shown in FIG. 20 as object detection GUI 560. According to an exemplary embodiment, the object detection GUI 560 facilitates activating various sensors (e.g., of the sensors 180, etc.) to detect objects within the proximity of the vehicle 10 that are position forward 562, rearward 564, to the right 566, and/or to the left 568 of the vehicle 10 and provide warnings when the vehicle 10 approaches too close to an object.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle control system comprising:
a vehicle including a vehicle controller and an electric drive motor configured to propel a tractive element; and
a portable user device including a user interface and a non-transitory computer-readable storage medium having instructions stored thereon that, upon execution by a processor of the portable user device, cause the processor to:
perform a verification process to verify that the portable user device has access to the vehicle;
wirelessly connect to the vehicle via a wireless transceiver of the portable user device in response to the portable user device being verified;
display a control interface for the vehicle on the user interface of the portable user device in response to connecting to the vehicle;
receive an input through the control interface regarding operation of the electric drive motor; and
provide a command to the vehicle controller based on the input to facilitate remote operation of the electric drive motor.

2. The vehicle control system of claim 1, wherein the portable user device includes a reader in the form of at least one of a camera or a RFID reader, and wherein the vehicle includes an identifier in the form of at least one of a QR code, a barcode, or a RFID tag.

3. The vehicle control system of claim 2, wherein the non-transitory computer-readable storage medium having instructions stored thereon that, upon execution by the processor, cause the processor to perform the verification process by scanning the identifier with the reader.

4. The vehicle control system of claim 1, wherein the control interface includes a drive and steer operation interface that facilitates remotely driving and steering the vehicle.

5. The vehicle control system of claim 1, wherein the control interface includes at least one of (a) a power button configured to facilitate remotely powering on or off the vehicle, (b) a horn button configured to facilitate activating and sounding a horn of the vehicle, (c) a speed toggle button configured to facilitate toggling between speed modes of the vehicle, or (d) a drive and steer trackpad including a drive button that is selectively repositionable within the drive and steer trackpad to facilitate driving and turning the vehicle.

6. The vehicle control system of claim 5, wherein the control interface includes the power button and the drive and steer trackpad.

7. The vehicle control system of claim 6, wherein the control interface includes the horn button.

8. The vehicle control system of claim 6, wherein the control interface includes the speed toggle button.

9. The vehicle control system of claim 1, wherein the vehicle includes a lift assembly.

10. The vehicle control system of claim 1, wherein the non-transitory computer-readable storage medium having instructions stored thereon that, upon execution by the processor, cause the processor to:
provide a live display on the user interface regarding an area in a field of view of a camera of the portable user device;
detect a controllable component of the vehicle within the live display; and
display the control interface in response to detecting the controllable component within the live display.

11. A vehicle control system comprising:
a vehicle including a vehicle controller, an electric drive motor configured to propel a tractive element, and a lift assembly configured to raise and lower a platform; and
a portable user device including a user interface and a non-transitory computer-readable storage medium having instructions stored thereon that, upon execution by a processor of the portable user device, cause the processor to:
perform a verification process to verify that the portable user device has access to the vehicle;
wirelessly connect to the vehicle via a wireless transceiver of the portable user device in response to the portable user device being verified;
display a control interface for the vehicle on the user interface of the portable user device in response to connecting to the vehicle;
receive one or more inputs through the control interface regarding operation of the electric drive motor and the lift assembly; and
provide one or more commands to the vehicle controller based on the one or more inputs to facilitate remote operation of the electric drive motor and the lift assembly.

12. The vehicle control system of claim 11, wherein the portable user device includes a reader in the form of at least one of a camera or a RFID reader, and wherein the vehicle includes an identifier in the form of at least one of a QR code, a barcode, or a RFID tag.

13. The vehicle control system of claim 12, wherein the non-transitory computer-readable storage medium having instructions stored thereon that, upon execution by the processor, cause the processor to perform the verification process by scanning the identifier with the reader.

14. The vehicle control system of claim 1, wherein the control interface includes a drive and steer operation interface that facilitates remotely driving and steering the vehicle.

15. The vehicle control system of claim 11, wherein the control interface includes at least one of (a) a power button configured to facilitate remotely powering on or off the vehicle, (b) a horn button configured to facilitate activating and sounding a horn of the vehicle, (c) a speed toggle button configured to facilitate toggling between speed modes of the vehicle, or (d) a drive and steer trackpad including a drive button that is selectively repositionable within the drive and steer trackpad to facilitate driving and turning the vehicle.

16. The vehicle control system of claim 15, wherein the control interface includes the power button and the drive and steer trackpad.

17. The vehicle control system of claim 16, wherein the control interface includes the speed toggle button.

18. The vehicle control system of claim 16, wherein the control interface includes the horn button.

19. The vehicle control system of claim 1, wherein the non-transitory computer-readable storage medium having instructions stored thereon that, upon execution by the processor, cause the processor to:
provide a live display on the user interface regarding an area in a field of view of a camera of the portable user device;
detect a controllable component of the vehicle within the live display; and display the control interface in response to detecting the controllable component within the live display.

20. A method for remotely operating a vehicle, the method comprising:
performing a verification process to verify that a portable user device has access to a vehicle;
wirelessly connecting the portable user device to the vehicle via a wireless transceiver of the portable user device in response to the portable user device being verified;
displaying, on a user interface of the portable user device, a control interface for the vehicle, wherein the control interface includes (a) a power button configured to facilitate remotely powering on or off the vehicle and (b) a movement interface configured to facilitate driving and turning the vehicle via an electric drive motor, and raising and lowering a lift assembly of the vehicle;
receive one or more inputs through the control interface regarding operation of the electric drive motor of the vehicle and the lift assembly; and
provide one or more commands to a vehicle controller of the vehicle based on the one or more inputs to facilitate remote operation of the electric drive motor and the lift assembly.

* * * * *